(12) United States Patent
Rosewarne et al.

(10) Patent No.: US 11,323,745 B2
(45) Date of Patent: May 3, 2022

(54) METHOD, APPARATUS AND SYSTEM FOR DECODING AND GENERATING AN IMAGE FRAME FROM A BITSTREAM

(71) Applicant: CANON KABUSHIKI KAISHA, Tokyo (JP)

(72) Inventors: Christopher James Rosewarne, Concord West (AU); Andrew James Dorrell, Glenbrook (AU)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 16/492,921

(22) PCT Filed: Feb. 9, 2018

(86) PCT No.: PCT/AU2018/000019
§ 371 (c)(1),
(2) Date: Sep. 10, 2019

(87) PCT Pub. No.: WO2018/165695
PCT Pub. Date: Sep. 20, 2018

(65) Prior Publication Data
US 2020/0014956 A1   Jan. 9, 2020

(30) Foreign Application Priority Data

Mar. 15, 2017 (AU) .............................. 2017201760

(51) Int. Cl.
*H04N 19/63* (2014.01)
*H04N 19/635* (2014.01)
(Continued)

(52) U.S. Cl.
CPC ......... *H04N 19/635* (2014.11); *H04N 19/103* (2014.11); *H04N 19/126* (2014.11);
(Continued)

(58) Field of Classification Search
CPC .. H04N 19/103; H04N 19/126; H04N 19/146; H04N 19/176; H04N 19/18;
(Continued)

(56) References Cited

U.S. PATENT DOCUMENTS 8,867,614 B2* 10/2014 Shiodera ................ H04N 19/61
375/240.03
2004/0213347 A1  10/2004 Kajiwara
(Continued)

FOREIGN PATENT DOCUMENTS

CN      110383835 A     10/2019
JP      2020502960 A    1/2020
(Continued)

OTHER PUBLICATIONS

IntoPIX: intoPIX Codec Submission for JPEG-XS CfP, Design description, vol. 1, 73, Sep. 23, 2016, pp. 1-46, XP030190195.
(Continued)

*Primary Examiner* — Jessica M Prince
(74) *Attorney, Agent, or Firm* — Canon U.S.A., Inc. IP Division

(57) ABSTRACT

A system and method of decoding a set of greatest coded line index values for a precinct of video data from a video bitstream, the precinct of video data including one or more subbands. The method comprises decoding a greatest coded line index prediction mode for each subband from the video bitstream; decoding a plurality of greatest coded line index delta values for each subband from the video bitstream using the greatest coded line index prediction mode for the subband; and producing the greatest coded line index values for each subband using the plurality of greatest coded line index delta values and the greatest coded line index prediction mode for the subband.

18 Claims, 12 Drawing Sheets

(51) Int. Cl.
*H04N 19/103* (2014.01)
*H04N 19/126* (2014.01)
*H04N 19/176* (2014.01)
*H04N 19/18* (2014.01)
*H04N 19/184* (2014.01)
*H04N 19/91* (2014.01)

(52) U.S. Cl.
CPC ........... *H04N 19/176* (2014.11); *H04N 19/18* (2014.11); *H04N 19/184* (2014.11); *H04N 19/91* (2014.11)

(58) Field of Classification Search
CPC .... H04N 19/184; H04N 19/46; H04N 19/593; H04N 19/61; H04N 19/635; H04N 19/64; H04N 19/647; H04N 19/91
See application file for complete search history.

(56) References Cited

U.S. PATENT DOCUMENTS

| | | | |
|---|---|---|---|
| 2005/0053296 A1 | 3/2005 | Srinivasan et al. | |
| 2005/0100229 A1 | 5/2005 | Becker | |
| 2014/0247999 A1* | 9/2014 | Pellegrin | H04N 19/91 382/232 |
| 2019/0289295 A1* | 9/2019 | Keinert | H04N 19/167 |

FOREIGN PATENT DOCUMENTS

| | | |
|---|---|---|
| TW | 201642253 A | 12/2016 |
| WO | 2018/041840 A1 | 3/2018 |
| WO | 2018/114813 A1 | 6/2018 |

OTHER PUBLICATIONS

Text of ISO/IEC 21122 WD (JPEG XS) v2.6, Coding of Still Pictures, ISO/IEC/JTC1/SC 29/WG1, 74th meeting, Jan. 15-20, 2017, Doc. No. WG1N74031, Feb. 21, 2017, 48 pages, Geneva, XP030170365.

JPEG Core Experiments #2, Coding of Still Pictures, ISO/IEC 21122 (JPEG XS ), ISO/IEC JTC1/WG1, 74th meeting, Jan. 15-20, 2017, Feb. 21, 2017, Doc. No. WG1 N74033, 14 pages, Geneva, XP030170367.

G. Rouvroy, intoPIX Codec Submission for JPEG-XS CfP, JPEG ISO Livelink document, 2016, pp. 10-26, web, http://isotc.iso.org/livelink/livelink?func=ll&objId=8917308&objAction=browse&viewType=1.

* cited by examiner

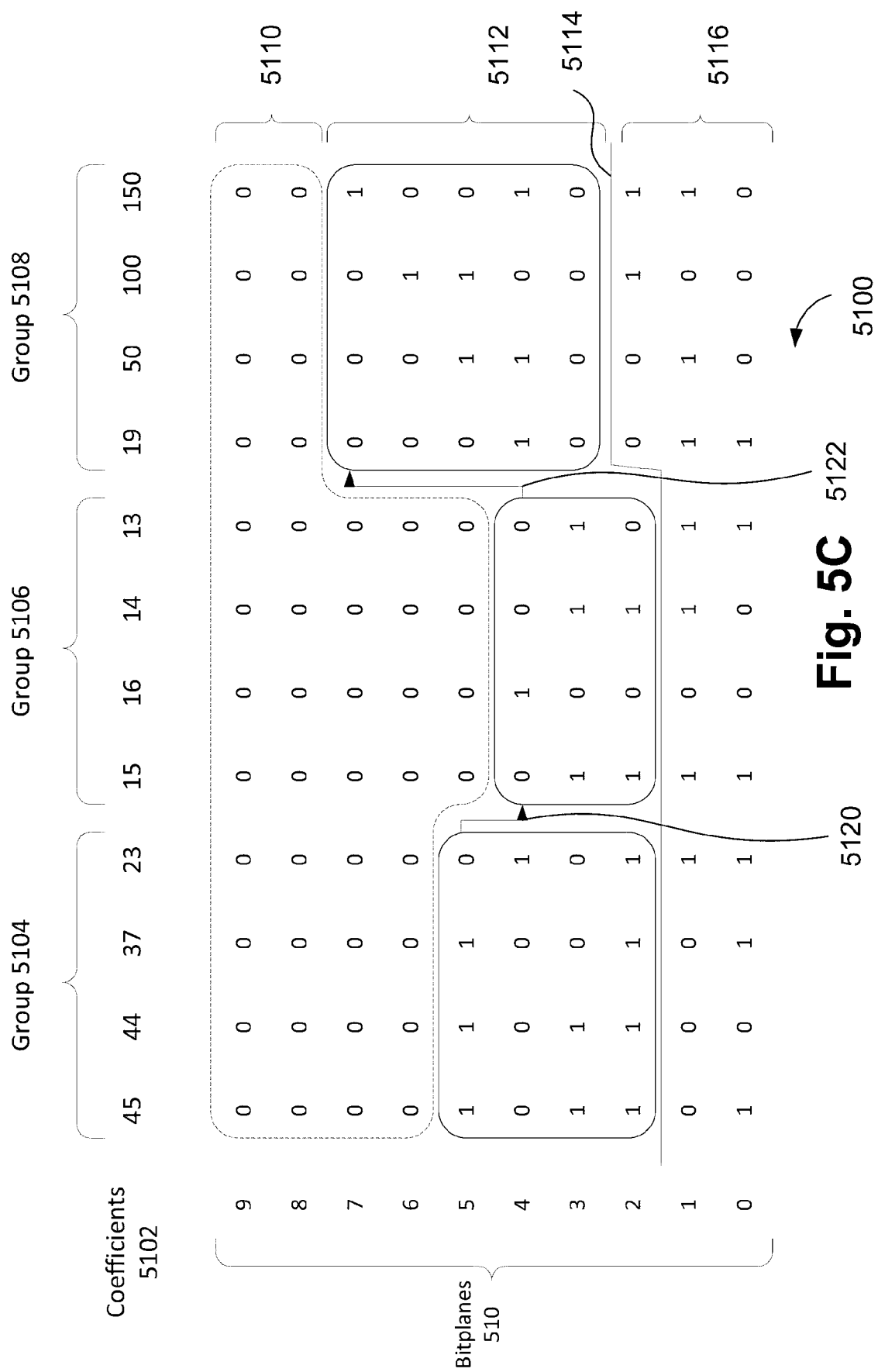

METHOD, APPARATUS AND SYSTEM FOR DECODING AND GENERATING AN IMAGE FRAME FROM A BITSTREAM

REFERENCE TO RELATED APPLICATIONS

This application claims the benefit under Convention priority of the filing date of Australian Patent Application No. 2017201760, filed 15 Mar. 2017, hereby incorporated by reference in its entirety as if fully set forth herein.

TECHNICAL FIELD

The present invention relates generally to digital video signal processing and, in particular, to a method, apparatus and system for encoding and decoding video data. The present invention also relates to a computer program product including a computer readable medium having recorded thereon a computer program for encoding and decoding video data.

BACKGROUND

Many applications for video coding currently exist, including applications for transmission and storage of video data. Many video coding standards have also been developed and others are currently in development. Much emphasis in video compression research is directed towards 'distribution codecs', i.e. codecs intended for distributing compressed video data to geographically dispersed audiences. However, an emerging area of research is directed towards 'mezzanine codecs'. Mezzanine codecs are used for highly localised distribution, i.e. within a broadcast studio, and are characterised by requirements for ultra-low latency, typically well under one frame, and greatly reduced complexity, both for the encoder and the decoder, compared to conventional video codecs. Recent developments in such coding within the International Organisations for Standardisation/International Electrotechnical Commission Joint Technical Committee 1/Subcommittee 29/Working Group 1 (ISO/IEC JTC1/SC29/WG1), also known as the Joint Photographic Experts Group (JPEG) have resulted in a standardisation work item named 'JPEG XS'. The goal of JPEG XS is to produce a codec having an end-to-end latency not exceeding 32 lines of video data, and capability for implementation within relatively modest implementation technologies, e.g. mid-range FPGAs from vendors such as Xilinx®. The latency requirements of JPEG XS mandate use of strict rate control techniques to ensure coded data does not vary excessively relative to the capacity of the channel carrying the compressed video data.

In a broadcast studio, video may be captured by a camera before undergoing several transformations, including real-time editing, graphic and overlay insertion and mixing different content sources into one final output. Once the video has been adequately processed, a distribution encoder is used to encode the video data for final distribution to end consumers. Within the studio, the video data is generally transported in an uncompressed format. Transporting uncompressed video data necessitates the use of very high speed links. Variants of the Serial Digital Interface (SDI) protocol can transport different video formats. For example, 3G-SDI (operating with a 3 Gbps electrical link) can transport 1080p HDTV (1920×1080 resolution) at 30 fps and 8 bits per sample. Interfaces having a fixed bit rate are suited to transporting data having a constant bit rate (CBR). Uncompressed video data is generally CBR, and compressed video data, in the context of ultra-low latency coding, is generally expected to also be CBR.

As bit rates increase, achievable cabling lengths reduce, which becomes problematic for cable routing through a studio. For example, UHDTV (3840×2160) requires a 4× increase in bandwidth compared to 1080p HDTV, implying a 12 Gbps interface. Increasing the data rate of a single electrical channel reduces the achievable length of the cabling. At 3 Gbps, cable runs generally cannot exceed 150 m, the minimum usable length for studio applications. One method of achieving higher rate links is by replicating cabling, e.g. by using four 3G-SDI links, with frame tiling or some other multiplexing scheme. However, the cabling replicating method increases cable routing complexity, requires more physical space, and may reduce reliability compared to use of a single cable. Thus, a codec that can perform compression at relatively low compression ratios (e.g. 4:1) while retaining a 'visually lossless' (i.e. having no perceivable artefacts compared to the original video data) level of performance is required by industry. Compression ratios may also be expressed as the number of 'bits per pixel' (bpp) afforded to the compressed stream, noting that conversion back to a compression ratio requires knowledge of the bit depth of the uncompressed signal, and the chroma format. For example, 8b 4:4:4 video data occupies 24 bpp uncompressed, so 4 bpp implies a 6:1 compression ratio.

Video data includes one or more colour channels. Generally there is one primary colour channel and two secondary colour channels. The primary colour channel is generally referred to as the 'luma' channel and the secondary colour channel(s) are generally referred to as the 'chroma' channels. Video data is represented using a colour space, such as 'YCbCr' or 'RGB'. Some applications require visually lossless compression of the output of a computer graphics card, or transmission from a system-on-chip (SOC) in a tablet to the LCD panel in the tablet. Content from a graphics card or SOC often has different statistical properties from content captured from a camera, due to the use of rendering widgets, text, icons etc. The associated applications can be referred to as 'screen content applications'. For screen content applications, 'RGB' is commonly used, as 'RGB' is the format generally used to drive LCD panels. The greatest signal strength is present in the 'G' (green) channel, so generally the G channel is coded using the primary colour channel, and the remaining channels (i.e. 'B' and 'R') are coded using the secondary colour channels. The arrangement may be referred to as 'GBR'. When the 'YCbCr' colour space is in use, the 'Y' channel is coded using the primary colour channel and the 'Cb' and 'Cr' channels are coded using the secondary colour channels.

Video data is also represented using a particular chroma format. The primary colour channel and the secondary colour channels are spatially sampled at the same spatial density when a 4:4:4 chroma format is in use. For screen content, a commonly used chroma format is 4:4:4, as generally LCD panels provide pixels at a 4:4:4 chroma format. The bit-depth defines the bit width of samples in the respective colour channel, which implies a range of available sample values. Generally, all colour channels have the same bit-depth, although the colour channels may alternatively have different bit-depths. Other chroma formats are also possible. For example, if the chroma channels are sampled at half the rate horizontally (compared to the luma channel), a 4:2:2 chroma format is said to be in use. Also, if the chroma channels are sampled at half the rate horizontally and vertically (compared to the luma channel), a 4:2:0 chroma format is said to be in use. These chroma formats exploit a characteristic of the human visual system that sensitivity to intensity is higher than sensitivity to colour. As such, reducing sampling of the colour channels without causing undue visual impact is possible. However, the reduction in sampling of the colour channels is less applicable to studio environments, where multiple generations of encoding and decoding are common. Also, for screen content the use of chroma formats other than 4:4:4 can be problematic as distortion is introduced to sub-pixel rendered (or 'anti-aliased') text and sharp object edges.

Frame data may also contain a mixture of screen content and camera captured content. For example, a computer screen may include various windows, icons and control buttons, text, and also contain a video being played, or an image being viewed. The content, in terms of the entirety of a computer screen, can be referred to as 'mixed content'. Moreover, the level of detail (or 'texture') of the content varies within a frame. Generally, regions of detailed textures (e.g. foliage, text), or regions containing noise (e.g. from a camera sensor) are difficult to compress. The detailed textures can only be coded at a low compression ratio without losing detail. Conversely, regions with little detail (e.g. flat regions, sky, background from a computer application) can be coded with a high compression ratio, with little loss of detail.

In terms of low complexity, one popular solution is application of a 'Wavelet' transform, applied hierarchically across an image. Wavelet transforms are well-studied in the context of the JPEG2000 image coding standard. The wavelet transform application across an image differs from a block-based codec, such as H.264/AVC, which applies numerous discrete cosine transforms (DCTs) across the spatial extent of each frame. Each block in H.264/AVC is predicted using one of a variety of methods, achieving a high degree of local adaptivity, at a price of increased encoder complexity due to the need for mode decisions to be made. In contrast, the Wavelet transform is applied over a wide spatial area, and thus the prediction modes available to a block based codec are generally not applicable, resulting in a greatly reduced disparity in the complexity of the encoder and the decoder.

In the context of wavelet-based compression techniques, achieving high visual quality across a frame containing multiple types of content (mixed) is problematic. Achieving high visual quality across a frame having mixed content can be particularly problematic when strict local rate control is needed to meet ultra-low latency requirements.

SUMMARY

It is an object of the present invention to substantially overcome, or at least ameliorate, one or more disadvantages of existing arrangements.

One aspect of the present disclosure provides a method of decoding a set of greatest coded line index values for a precinct of video data from a video bitstream, the precinct of video data including one or more subbands, the method comprising: decoding a greatest coded line index prediction mode for each subband from the video bitstream; decoding a plurality of greatest coded line index delta values for each subband from the video bitstream using the greatest coded line index prediction mode for the subband; and producing the greatest coded line index values for each subband using the plurality of greatest coded line index delta values and the greatest coded line index prediction mode for the subband.

According to another aspect, each greatest coded line index value signals a most significant bit-plane among a group of coefficients coded in the video bitstream.

Another aspect of the present disclosure provides a method of encoding a set of greatest coded line index values for a precinct of video data into a video bitstream, the precinct of video data including one or more subbands, the method comprising: encoding a greatest coded line index prediction mode for each subband into the video bitstream; and encoding a plurality of greatest coded line index delta values for each subband into the video bitstream using the greatest coded line index prediction mode for the subband.

According to another aspect, each greatest coded line index value signals a most significant bit-plane among a group of coefficients coded in the video bitstream.

Another aspect of the present disclosure provides a computer readable medium having a program stored thereon for decoding a set of greatest coded line index values for a precinct of video data from a video bitstream, the precinct of video data including one or more subbands, the program comprising: code for decoding a greatest coded line index prediction mode for each subband from the video bitstream; code for decoding a plurality of greatest coded line index delta values for each subband from the video bitstream using the greatest coded line index prediction mode for the subband; and code for producing the greatest coded line index values for each subband using the plurality of greatest coded line index delta values and the greatest coded line index prediction mode for the subband.

According to another aspect, each greatest coded line index value signals a most significant bit-plane among a group of coefficients coded in the video bitstream.

Another aspect of the present disclosure provides a computer readable medium having a program stored thereon for encoding a set of greatest coded line index values for a precinct of video data into a video bitstream, the precinct of video data including one or more subbands, the program comprising: code for encoding a greatest coded line index prediction mode for each subband into the video bitstream; and code for encoding a plurality of greatest coded line index delta values for each subband into the video bitstream using the greatest coded line index prediction mode for the subband.

According to another aspect, each greatest coded line index value signals a most significant bit-plane among a group of coefficients coded in the video bitstream.

Another aspect of the present disclosure provides a system for decoding a set of greatest coded line index values for a precinct of video data from a video bitstream, the precinct of video data including one or more subbands, the system comprising: a memory for storing data and a computer readable medium; a processor coupled to the memory for executing a computer program, the program having instructions for: decoding a greatest coded line index prediction mode for each subband from the video bitstream; decoding a plurality of greatest coded line index delta values for each subband from the video bitstream using the greatest coded line index prediction mode for the subband; and producing the greatest coded line index values for each subband using the plurality of greatest coded line index delta values and the greatest coded line index prediction mode for the subband.

According to another aspect, each greatest coded line index value signals a most significant bit-plane among a group of coefficients coded in the video bitstream.

Another aspect of the present disclosure provides a system for encoding a set of greatest coded line index values for a precinct of video data into a video bitstream, the precinct of video data including one or more subbands, the system comprising: a memory for storing data and a computer readable medium; a processor coupled to the memory for executing a computer program, the program having instructions for: encoding a greatest coded line index prediction mode for each subband into the video bitstream; and encoding a plurality of greatest coded line index delta values for each subband into the video bitstream using the greatest coded line index prediction mode for the subband.

According to another aspect, each greatest coded line index value signals a most significant bit-plane among a group of coefficients coded in the video bitstream.

Another aspect of the present disclosure provides a decoder configured to: receive a precinct of video data from a video bitstream, the precinct of video data including one or more subbands; decode a greatest coded line index prediction mode for each subband from the video bitstream; decode a plurality of greatest coded line index delta values for each subband from the video bitstream using the greatest coded line index prediction mode for the subband; and produce the greatest coded line index values for each subband using the plurality of greatest coded line index delta values and the greatest coded line index prediction mode for the subband.

According to another aspect, each greatest coded line index value signals a most significant bit-plane among a group of coefficients coded in the video bitstream.

Another aspect of the present disclosure provides a video encoder configured to: receive a precinct of video data, the precinct of video data including one or more subbands; encode a greatest coded line index prediction mode for each subband into the video bitstream; and encode a plurality of greatest coded line index delta values for each subband into the video bitstream using the greatest coded line index prediction mode for the subband.

According to another aspect each greatest coded line index value signals a most significant bit-plane among a group of coefficients coded in the video bitstream.

Another aspect of the present disclosure provides a method for generating a precinct of video data from a video bitstream, the precinct of video data including one or more subbands, the method comprising: decoding an offset table from the video bitstream, the offset table defining a set of non-uniform quantisation offsets, each quantisation offset of the set of non-uniform quantisation offsets applied to a group of subband coefficients of the video data, wherein the offset table is generated to decrease a precision afforded to subband coefficients of portions of the subband containing greater magnitude coefficients relative to portions of the subband containing relatively lower magnitude coefficients; decoding a group of subband coefficients for a subband from the video bitstream by applying the decoded offset table to determine a number of bits to read for each coefficient based on the quantisation offset for the group of sub-band coefficients; and applying an inverse wavelet transform to the decoded group of sub-band coefficients to generate the precinct of video data.

In another aspect, the offset table is applied to subbands from a fixed level down to level 0.

In another aspect, the offset table is constrained to use offset values of zero or one for each of the quantisation offsets.

In another aspect, the offset table is stored in the video bitstream as a fixed length sequence of bits, with one bit per offset.

In another aspect, the offset table is generated by testing offset values and generating an error.

In another aspect, generation of the offset table relates to applying a positive offset where a region of content known to contain high frequency energy is present.

In another aspect, the offset map generation is sensitive to the overall bit-rate afforded to the precinct.

Another aspect of the present disclosure provides a computer readable medium having a program stored thereon for generating a precinct of video data from a video bitstream, the precinct of video data including one or more subbands, the program comprising: code for decoding an offset table from the video bitstream, the offset table defining a set of non-uniform quantisation offsets, each quantisation offset of the set of non-uniform quantisation offsets applied to a group of subband coefficients of the video data, wherein the offset table is generated to decrease a precision afforded to subband coefficients of portions of the subband containing greater magnitude coefficients relative to portions of the subband containing relatively lower magnitude coefficients; code for decoding a group of subband coefficients for a subband from the video bitstream by applying the decoded offset table to determine a number of bits to read for each coefficient based on the quantisation offset for the group of sub-band coefficients; and code for applying an inverse wavelet transform to the decoded group of sub-band coefficients to generate the precinct of video data.

Another aspect of the present disclosure provides a system for generating a precinct of video data from a video bitstream, the precinct of video data including one or more subbands, the system comprising: a memory for storing data and a computer readable medium; a processor coupled to the memory for executing a computer program, the program having instructions for: decoding an offset table from the video bitstream, the offset table defining a set of non-uniform quantisation offsets, each quantisation offset of the set of non-uniform quantisation offsets applied to a group of subband coefficients of the video data, wherein the offset table is generated to decrease a precision afforded to subband coefficients of portions of the subband containing greater magnitude coefficients relative to portions of the subband containing relatively lower magnitude coefficients; decoding a group of subband coefficients for a subband from the video bitstream by applying the decoded offset table to determine a number of bits to read for each coefficient based on the quantisation offset for the group of sub-band coefficients; and applying an inverse wavelet transform to the decoded group of sub-band coefficients to generate the precinct of video data.

Another aspect of the present disclosure provides a video decoder configured to: receive a video bitstream, wherein a precinct of video data of the video bitstream includes one or more subbands; decoding an offset table from the video bitstream, the offset table defining a set of non-uniform quantisation offsets, each quantisation offset of the set of non-uniform quantisation offsets applied to a group of subband coefficients of the video data, wherein the offset table is generated to decrease a precision afforded to subband coefficients of portions of the subband containing greater magnitude coefficients relative to portions of the subband containing relatively lower magnitude coefficients; decoding a group of subband coefficients for a subband from the video bitstream by applying the decoded offset table to determine a number of bits to read for each coefficient based on the quantisation offset for the group of sub-band coefficients; and applying an inverse wavelet transform to the decoded group of sub-band coefficients to generate the precinct of the video data.

Other aspects are also disclosed.

BRIEF DESCRIPTION OF THE DRAWINGS

At least one embodiment of the present invention will now be described with reference to the following drawings and appendices, in which:

FIG. 5C is a schematic block diagram showing a subband coefficient grouping for representation in a bitstream, with a fixed truncation threshold;

DETAILED DESCRIPTION INCLUDING BEST MODE

Figure 1:
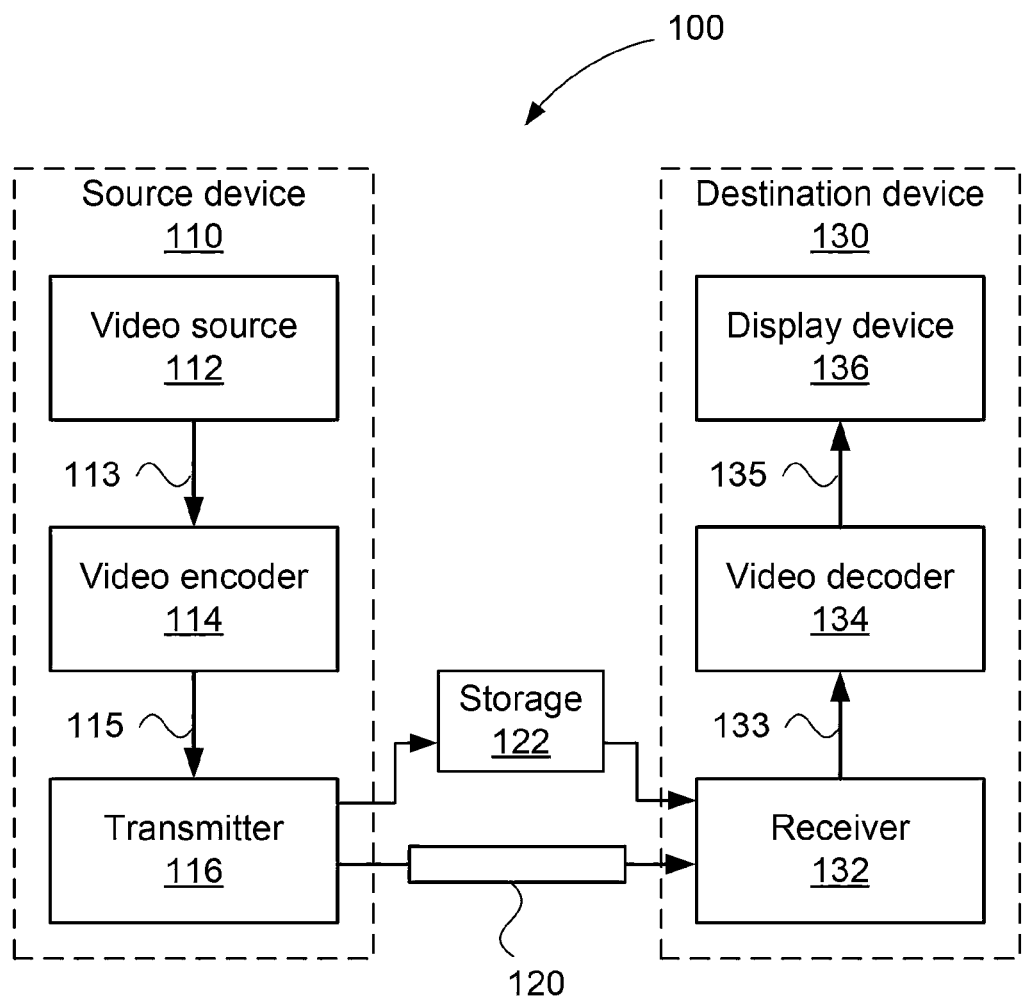
FIG. 1 is a schematic block diagram showing a sub-frame latency video encoding and decoding system.

Where reference is made in any one or more of the accompanying drawings to steps and/or features, which have the same reference numerals, those steps and/or features have for the purposes of this description the same function(s) or operation(s), unless the contrary intention appears.

FIG. 1 is a schematic block diagram showing function modules of a sub-frame latency video encoding and decoding system 100. The system 100 may use a spatially localised coefficient coding approach to improve overall visual quality by reducing local bitrate consumption where such consumption is less visually significant.

Rate control and buffer management mechanisms ensure that no buffer underruns and resulting failure to deliver decoded video occur (e.g. due to variations in the complexity and time taken for encoder searching of possible modes) of incoming video data to a video encoder 114), so that decoded video frames from a video decoder 134 are delivered according to the timing of an interface over which the video frames are delivered. The interface over which the video frames are delivered may be, for example, SDI. Interfaces such as SDI have sample timing synchronised to a clock source, with horizontal and vertical blanking periods. As such, samples of the decoded video need to be delivered in accordance with the frame timing of the SDI link. Video data formatted for transmission over SDI may also be conveyed over Ethernet, e.g. using methods as specified in SMPTE ST. 2022-6. In the event that samples were not delivered according to the required timing, noticeable visual artefacts would result (e.g. from invalid data being interpreted as sample values by the downstream device). Accordingly, the rate control mechanism ensures that no buffer overruns and resulting inability to process incoming video data occur. A similar constraint exists for the inbound SDI link to the video encoder 114, which needs to encode samples in accordance with arrival timing and may not stall incoming video data to the video encoder 114, e.g. due to varying processing demand for encoding different regions of a frame.

As described above, the video encoding and decoding system 100 has a latency of less than one frame of video data. In particular, some applications require latencies not exceeding 32 lines of video data from the input of the video encoder 114 to the output of the video decoder 134. The latency may include time taken during input/output of video data and storage of partially-coded video data prior to and after transit over a communications channel. Generally, video data is transmitted and received in raster scan order, e.g. over an SDI link. Each frame is divided into 'precincts', each precinct generally being two lines of luma samples in height and having a width equal to a width of the frame. Then, a rate smoothing window of one or more precincts is applied to set a target rate for a current precinct. The bitstream is written to a buffer, such that the data for one compressed precinct is assembled in the buffer prior to transmission.

The system 100 includes a source device 110 and a destination device 130. A communication channel 120 is used to communicate encoded video information from the source device 110 to the destination device 130. In some arrangements, the source device 110 and destination device 130 comprise respective broadcast studio equipment, such as an overlay insertion and real-time editing module, in which case the communication channel 120 may be an SDI link. Typically, the communication channel 120 is a 'CBR' channel. The communication channel 120 accordingly affords a fixed limit on available bandwidth. For uncompressed video data, the bandwidth of the communication channel 120 is simply set to match the bandwidth of the uncompressed video data. For compressed video data, the required bandwidth generally varies temporally, with each precinct permitted to vary in compressed size within a limit set by a rate control lookahead window of several precincts. Averaged over many precincts, a fixed size must be maintained. Lower complexity implementations that lack a rate control lookahead window use a fixed size for each compressed precinct of video data. The compressed precincts of video data are conveyed over the communications channel 120. The communications channel 120 can utilise an interface intended for conveying uncompressed data, such as SDI or HDMI, even though in the system 100, compressed data is conveyed.

In other arrangements, the source device 110 and destination device 130 comprise a graphics driver as part of a system-on-chip (SOC) and an LCD panel (e.g. as found in a smart phone, tablet or laptop computer). In SOC arrangements the communication channel 120 is typically a wired channel, such as PCB trackwork and associated connectors. Moreover, the source device 110 and the destination device 130 can comprise any of a wide range of devices, including devices supporting over the air television broadcasts, cable television applications, internet video applications and applications where encoded video data is captured on some storage medium or a file server. The source device 110 may also be a digital camera capturing video data and outputting the video data in a compressed format offering visually lossless compression, as such the performance may be considered as equivalent to a truly lossless format (e.g. uncompressed).

As shown in FIG. 1, the source device 110 includes a video source 112, the video encoder 114 and a transmitter 116. The video source 112 typically comprises a source of uncompressed video data 113. The video source 112 can be an imaging sensor, a previously captured video sequence stored on a non-transitory recording medium, or a video feed from a remote imaging sensor for example. The uncompressed video data 113 is transmitted from the video source 112 to the video encoder 114 over a CBR channel, with fixed timing of the delivery of the video data. The video data is typically delivered in a raster scan format, with signalling to delineate between lines ('horizontal sync') and frames ('vertical sync'). The video source 112 may also be the output of a computer graphics card, e.g. displaying the video output of an operating system and various applications executing upon a computing device, for example a tablet computer. Content output from a graphics card is an example of 'screen content'. Examples of source devices 110 that may include an imaging sensor as the video source 112 include smartphones, video camcorders and network video cameras. As screen content may include smoothly rendered graphics and playback of natural content in various regions, screen content is also commonly a form of 'mixed content'. The video encoder 114 converts the uncompressed video data 113 from the video source 112 into encoded video data, as will be described further with reference to FIG. 3.

The video encoder 114 encodes the incoming uncompressed video data 113. The video encoder 114 is required to encode the incoming video data in real-time. That is, the video encoder 114 is not able to stall the incoming uncompressed video data 113 if for example the rate of processing the incoming data were to fall below the input data rate. The video encoder 114 outputs compressed video data 115 ('bitstream'), at a constant bit rate. In a typical video streaming application, the entire bitstream is not stored in any one location. Instead, the precincts of compressed video data are continually being produced by the video encoder 114 and consumed by the video decoder 134, with intermediate storage, e.g., in the (CBR) communication channel 120. The CBR stream compressed video data is transmitted by the transmitter 116 over the communication channel 120 (e.g. an SDI link). In other arrangements the compressed video data is stored in a non-transitory storage device 122, such as a "Flash" memory or a hard disk drive, until later being transmitted over the communication channel 120, or in-lieu of transmission over the communication channel 120.

The destination device 130 includes a receiver 132, a video decoder 134 and a display device 136. The receiver 132 receives encoded video data from the communication channel 120 and transmits received video data 133 to the video decoder 134. The video decoder 134 then outputs decoded frame data to the display device 136. Examples of the display device 136 include a cathode ray tube, a liquid crystal display (such as in smart-phones), tablet computers, computer monitors or in stand-alone television sets. In other arrangements, the functionality of each of the source device 110 and the destination device 130 is embodied in a single device. Example arrangements where the functionalities of the devices 110 and 130 are embodied on a single device include mobile telephone handsets and tablet computers, or equipment within a broadcast studio including overlay insertion units.

Figure 2A:
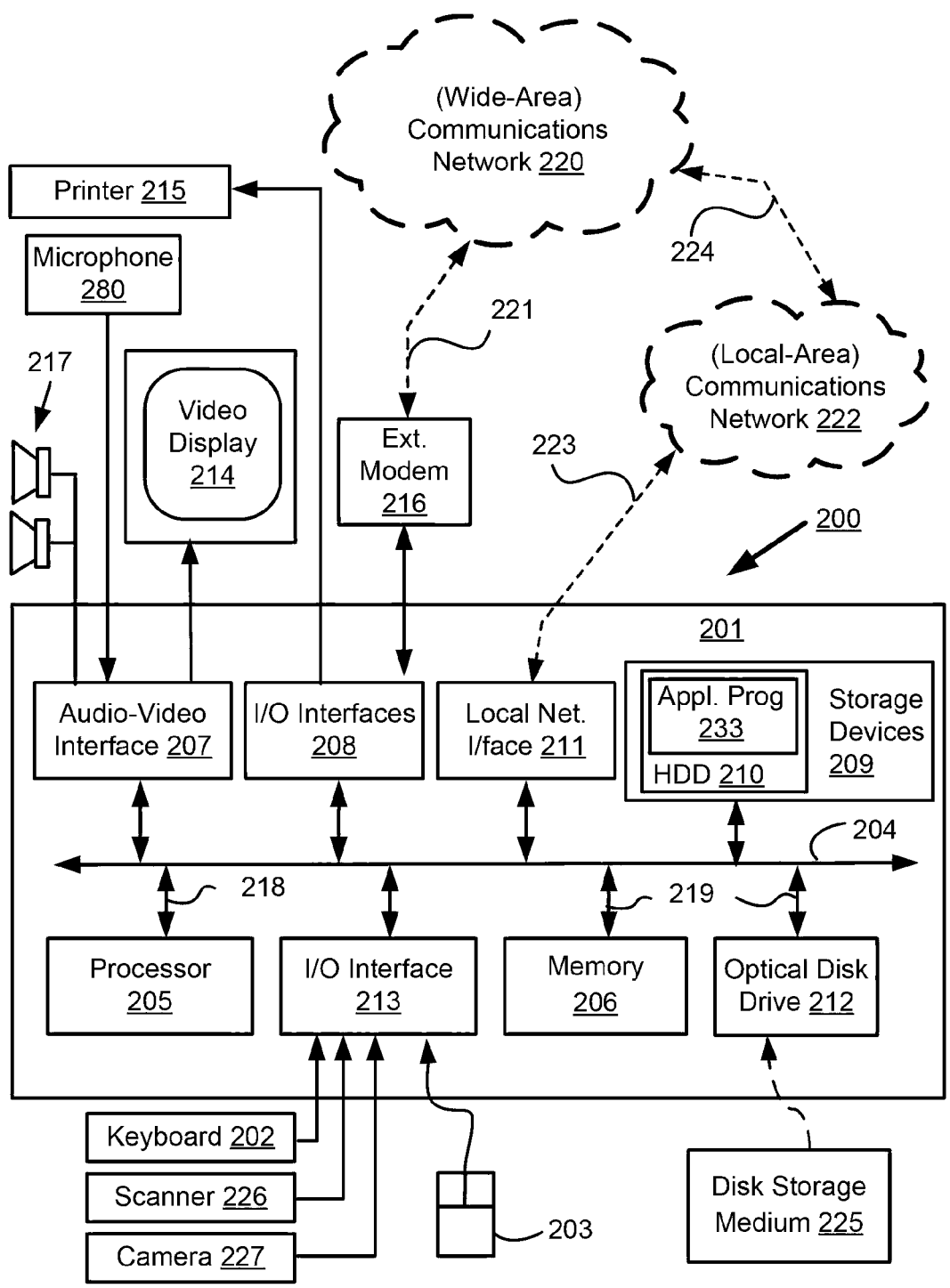
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card and provides an example of 'screen content'. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100, or the source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
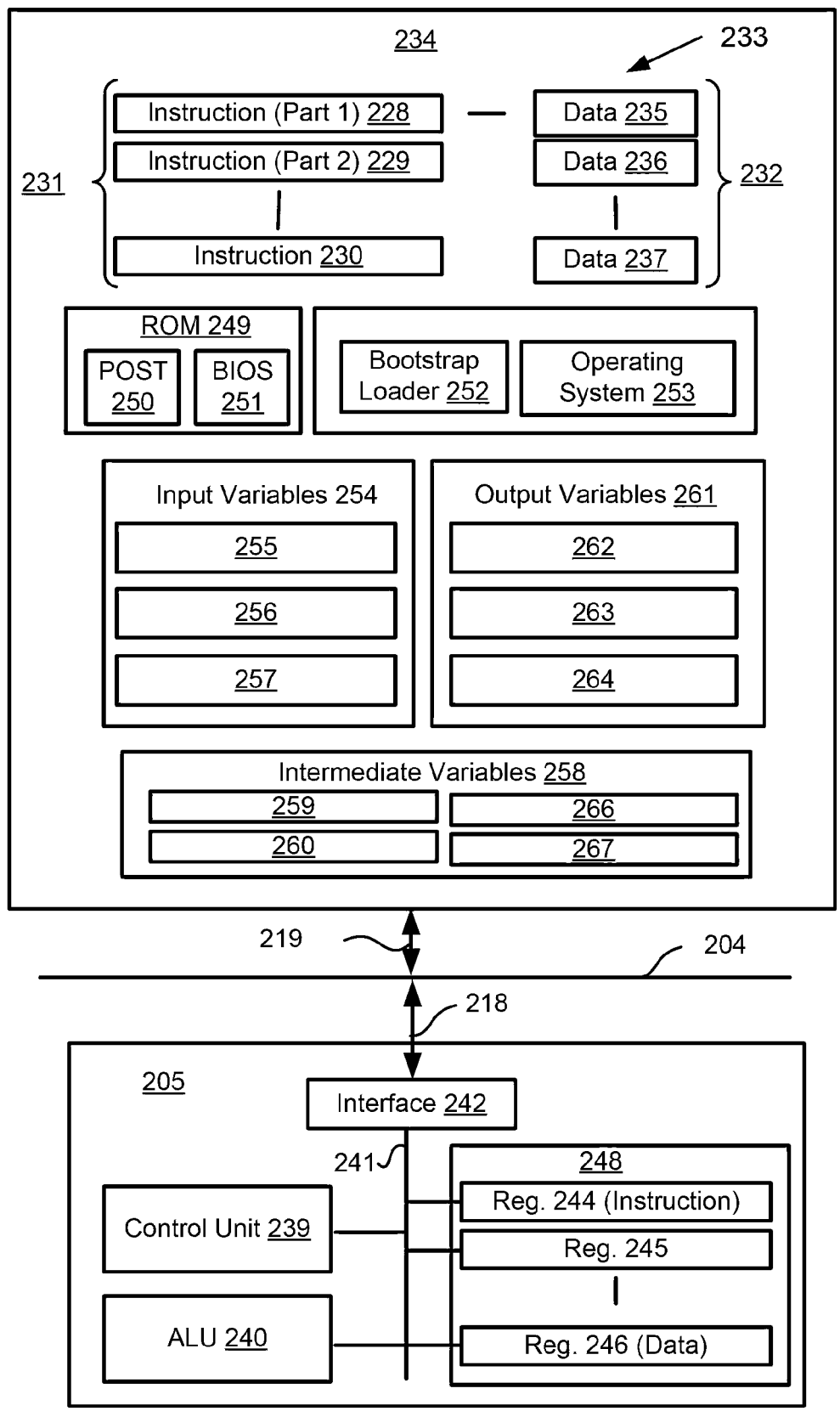

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A need to be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 7:
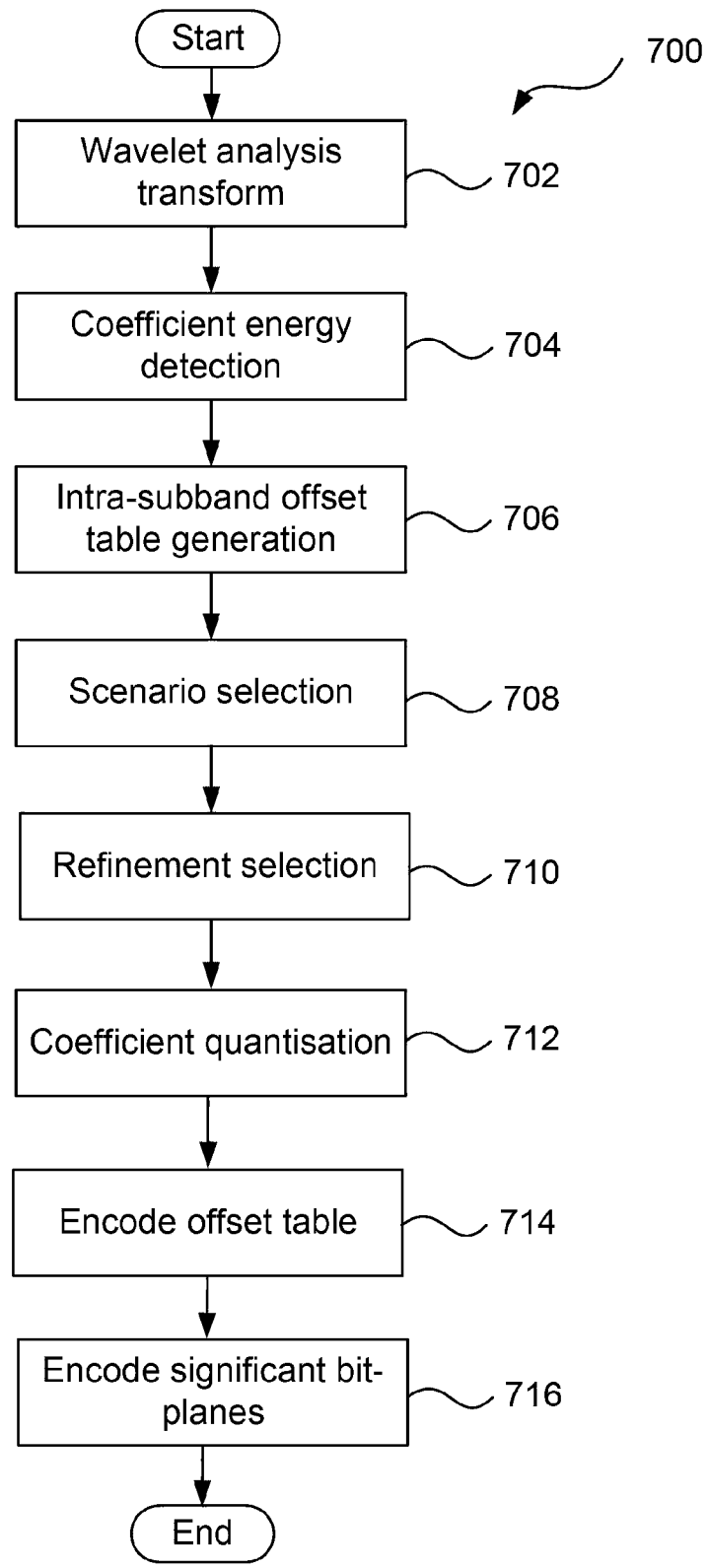
FIG. 7 is a schematic flow diagram showing a method of encoding a bitstream with a variable truncation offset within a subband.
Figure 8:
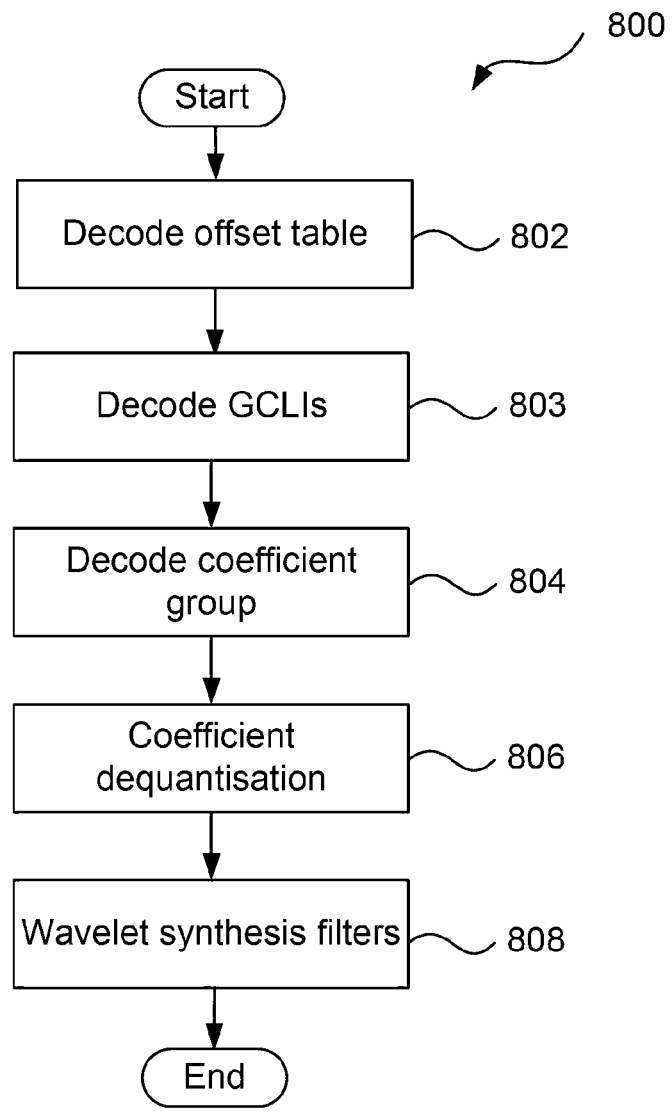
FIG. 8 is a schematic flow diagram showing a method of decoding a bitstream with a variable truncation offset within a subband.

Each step or sub-process in the method of FIGS. 7 and 8, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3:
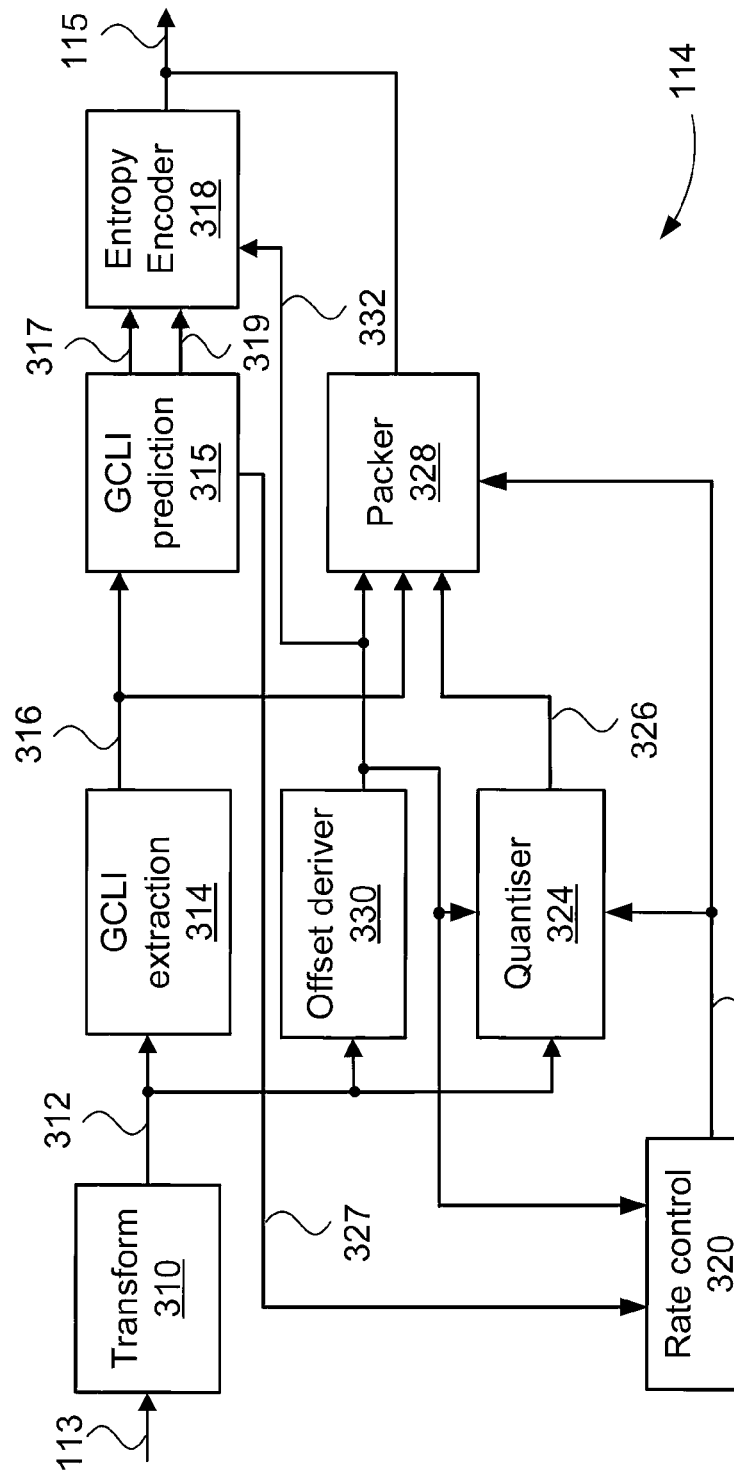
FIG. 3 is a schematic block diagram showing functional modules of a video encoder.
Figure 4:
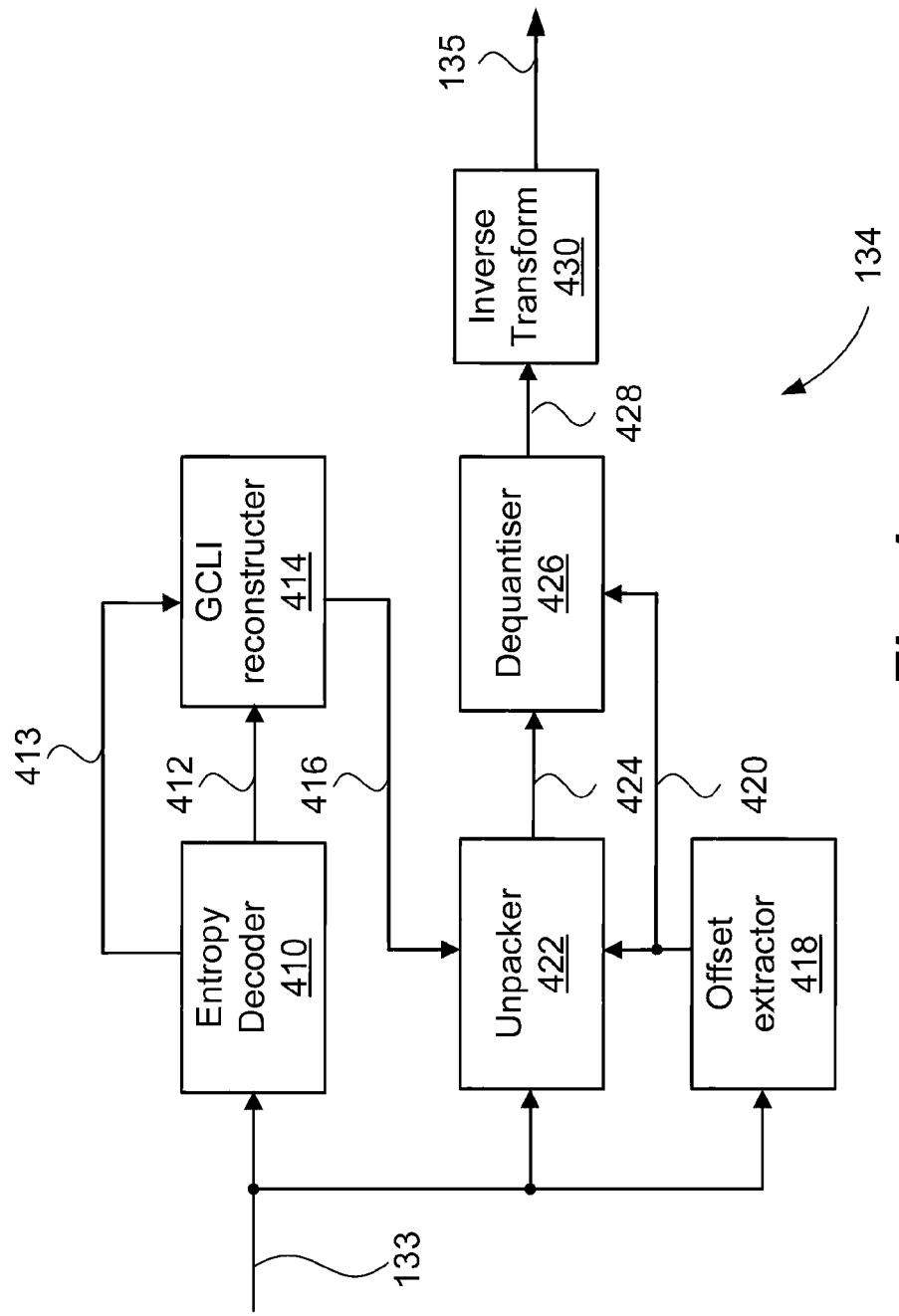
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205, or alternatively by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. In particular the video encoder 114 comprises modules 310, 314, 315, 318, 320, 324, 328 and 330 and the video decoder 134 comprises modules 410, 414, 418, 422, 426 and 430. Each of the modules of the video encoder 114 and the video decoder 134 may each be implemented as one or more software code modules of the software application program 233, or an FPGA 'bitstream file' that configures internal logic blocks in the FPGA to realise the video encoder 114 and the video decoder 134.

Although the video encoder 114 of FIG. 3 is an example of a low latency video encoder, other video codecs may also be used to perform the processing stages described herein. The video encoder 114 receives captured frame data, such as a series of frames, each frame including one or more colour channels.

Referring to FIG. 3, a transform module 310 receives the uncompressed video data 113 from the video source 112 and performs a hierarchical wavelet forward transform using a set of analysis filter banks. Generally, a 5/3 Le Gall wavelet is used, although other wavelet transforms can be used, such as a Haar wavelet or a Cohen-Daubechies-Feauveau 9/7 wavelet. The transform module 310 produces wavelet coefficients. The wavelet coefficients are grouped into subbands according to a wavelet decomposition structure. The transform module 310 outputs grouped wavelet coefficients 312. The wavelet decomposition structure is described further below with reference to FIGS. 5A and 5B.

Due to the ultra-low latency requirement, the number of levels of decompositions vertically is highly constrained, often to not more than two levels (generally only one level, as two levels reduces the number of precincts available for rate control lookahead). Horizontally, the number of levels of decompositions is relatively unconstrained, with five levels generally used. Considering the case of one level of vertical decomposition, within each subband is a set of coefficients arranged as an array of one coefficient in height and some number of coefficients in width. The arrangement of coefficients may be considered a list, and contrasts with the typical usage in codecs such as JPEG2000, where the coefficients in each subband are generally a square-shaped array. The list of coefficients within each subband can then be scanned. However, firstly a grouping operation is applied, i.e. each subband is divided into a set of equal-sized groups of coefficients for a purpose of entropy coding. Although various group sizes can be used, and group size need not be constant across all subbands, a fixed group size of four for all subbands typically provides close to optimal performance under a variety of test data. Thus, the transform module produces the grouped coefficients 312.

The grouped coefficients 312 are passed to a greatest coded line index (GCLI) extractor module 314. The grouped coefficients 312 are coded as a series of bit-planes (or lines'), i.e. bit 'n' of each coefficient within the group is coded as a unit of four bits by the module 314. Firstly, the bit-plane index of the bit-plane containing the highest most significant bit of the coefficients within a coefficient group is determined. The bit-plane index is referred to as a greatest coded line index (GCLI). Collectively (i.e. across all coefficient groups and subbands), the indices form greatest coded line indices (GCLIs) 316. The GCLIs 316 are passed to a GCLI prediction module 315. A prediction mode 319 is selected for the GCLIs over all subbands in the precinct by the module 315. In alternative arrangements, a separate GCLI prediction mode may be determined independently for each subband. In arrangements determining a GCLI prediction mode for each subband, the GCLI prediction mode of each subband is separately signalled in the encoded bitstream 115. Available prediction modes include horizontal, vertical and raw (no prediction). Other prediction modes are also available, including an 'HSIG' and 'VSIG' mode whereby runs of consecutive zero valued GCLIs are signalled. Other arrangements can use a 'Z-tree' prediction mode operating across subbands enables predicting zero-valued GCLIs for a subband at a lower decomposition levels from the presence of zero-valued GCLIs the subbands at the above decomposition level. If a separate GCLI prediction mode is available for each subband, the GCLI prediction mode search is constrained such that either all subbands use Z-tree prediction or no subbands use Z-tree prediction.

As a result of GCLI prediction, GCLI delta values 317 are produced by the module 315. The prediction mode 319 and the GCLI delta values 317 are passed to an entropy encoder module 318 for coding into an encoded bitstream 115. The GCLI prediction module 315 also produces a GCLI coding cost 327. The GCLI coding cost is indicative of the bit cost of coding the GCLI delta values 317. The representation of coefficients groups within a subband as a set of bit-planes is further discussed with reference to FIG. 5C.

The grouped coefficients 312 are also input to an offset deriver module 330. The offset deriver module 330 derives an offset table 332. The offset table 332 enables variation on the minimum bit-plane for coefficient groups within a subband. The intra-subband variation allows for reduced coding cost of particular sets of coefficients groups for which lower quality is acceptable. The reduction in coding cost for some coefficient groups affords an overall greater rate for the remaining coefficient groups in the precinct. The offset table 332 includes a list of offsets, each offset applied to coefficient groups at and below a particular subband level. The offset table (also referred to as an offset map) effectively defines a set of offsets, also referred to as quantisation offsets. Each of the offsets applied to a set of subband coefficients. The quantisation offsets are typically non-uniform. Coefficients above the particular subband level are not affected. Higher subband levels have fewer coefficients, so reducing precision of the coefficients of the higher subband levels makes relatively less contribution to saving bitrate compared to reducing precision of coefficients at lower subband levels. The offset table 332 is generally applied across an entire precinct, with each offset applying to a coefficient at a particular subband level, and to coefficients at lower subband levels that are collocated in the sense of overlapping filter support. The overlap in terms of filter support may be defined in terms of the true filter support, e.g. for a 5/3 Le Gall wavelet. Alternatively, even if a 5/3 Le Gall wavelet is used, the overlap may be defined in terms of the simpler support of a Haar wavelet, achieving reduced complexity with substantially the same effect.

A rate control module 320 receives the offset table 332 and the GCLI coding cost 327 and determines rate control parameters 322 for the precinct. The precinct is afforded a particular bit budget according to the precinct dimensions and the target bits per pixel value. Moreover, the bit budget for the precinct may be determined using a smoothing window over several precincts. For ultra-low latency operation, the size of the smoothing window is severely constrained, e.g. with one level of vertical decomposition, only four precincts are available for the smoothing window whilst meeting the end-to-end latency of 32 lines of video data. The GCLI coding cost 327 received from the GCLI prediction module 315 is deducted from the precinct bit budget, with the remaining bit budget available for coding of coefficient group bit-planes. Then, the rate control parameters 322 are selected such that the maximum amount of the bit budget for the precinct is used. The rate control parameters 322 include two parameters—the 'scenario' and the 'refinement' parameters. The scenario and the refinement parameters are both used for quantisation of the grouped coefficients 312. Truncation of wavelet coefficients is a mechanism by which the target bit budget is not exceeded. The 'scenario' sets an overall truncation point for all subbands. A global truncation across all subbands provides a course mechanism. Then, a finer granularity of rate control is provided by a 'refinement' level. The refinement level specifies a number of subbands for which one bit below that indicated by the 'scenario' is also coded. The refinement level consumes as much of the remaining bit budget until there is insufficient remaining bit budget for an additional subband worth of refinement bit-plane to be coded.

The following information is included in deriving the coding costs when selecting the scenario and refinement parameters. Firstly, the coding cost of the GCLIs for a precinct is determined, with remaining budget available for coefficient group bit-plane coding. The GCLI coding cost is affected by the scenario parameter selection, as raising the scenario results in a higher 'floor' of uncoded bit-planes (as described further with reference to FIG. 5C). For coefficient groups with where all significant bit-planes are below the floor, no bit-planes are coded. Signalling to skip over coefficient groups is thus affected by the selected scenario. Then, the cost of the bit-planes of each coefficient group is determined from the GCLI value for the coefficient group and a modified greatest truncated line index (GTLI) value for the coefficient group, where the GTLI resulting from the candidate scenario is adjusted according to the corresponding offset from the offset table 332. The rate control parameters 322 are provided to a quantiser module 324 and a packer module 328, and coded into the encoded bitstream 115.

The quantiser module 324 quantises wavelet coefficients from each group according to the rate control parameters 322 (i.e. the scenario and the refinement for the subband) and the offset table 332. A truncation point for coefficients in a subband is set by the scenario and refinement, and referred to as the 'greatest truncated line index' (GTLI). The GTLI is further modified by addition of an offset selected from the offset table 332.

The offset table 332 is applied such that one offset applies to wavelet coefficients across multiple subbands (the horizontal direction of decomposition is considered only). The offset map is applied from a fixed level, for example level N, down to level zero. For example, for subband levels above level N, no offset is applied, then for the subband at level N, one offset is applied per coefficient group, and for subbands below level N (e.g. at level M), each offset applies to $2^{N-M}$ coefficient groups. For example, if the offset map is generated at level two (of five levels), then one offset applies to one coefficient group at level two and the same offset applies to four coefficient groups at level zero. Prior to truncating coefficients according to the final GTLI, a rounding offset is applied so that the truncated coefficient value is closer to the value prior to truncation. Generally, uniform rounding provides good performance at low complexity. Finally, the quantiser module 324 outputs truncated coefficient groups 326 to the packer module 328.

The entropy encoder module 318 receives and encodes the GCLIs deltas 317 and the GCLI prediction mode 319. Several modes for predicting the GCLI values are available, with the selected mode being applied to all coefficient groups over all subbands within the precinct. Examples of a GCLI prediction mode include horizontal prediction, where the predictor is the left neighbouring coefficient group within a subband, and vertical prediction, where the predictor is the above neighbouring coefficient group, i.e. the coefficient group in the corresponding subband from the above precinct. A 'raw' mode is also available, where the GCLI value for each coefficient is coded, with no predictor used. As the number of coefficient groups is known from the chosen wavelet decomposition and the precinct dimensions, the GCLIs 316 are coded using a series of unary coded magnitudes of the GCLI delta, and including an additional bit for the sign of the GCLI delta. The resulting set of coded GCLI deltas 317 is written to the encoded bitstream 115 using a unary code and a sign bit for each value.

The packer module 328 packs data, including the bit-planes to be coded from each coefficient groups into the encoded bitstream 115. For each coefficient group, bit-planes from the indicated GCLI down to the modified GTLI are packed into the encoded bitstream 115. For cases where the modified GTLI has been increased beyond the GTLI as indicated by the scenario from the rate control parameters 322, a reduced coding cost for coefficient bit-plane data results. The rate control module 320 has already taken the reduced coding cost into account and may have selected additional subbands for refinement, or selected a higher scenario, as a result of the bit rate saving.

The resulting encoded bitstream 115 is transmitted to the video decoder 134 as a received bitstream 133 via the transmitter 116, the communications channel 120, and the receiver 132. The resulting encoded bitstream 115 may also be stored in the non-transitory storage 122. The non-transitory storage can exist in addition to, or instead of, or as part of, the communications channel 120.

Referring to FIG. 4, an entropy decoder module 410 receives the received bitstream 133. Firstly, a frame header is decoded by the module 410. The frame header signals items including the frame dimensions and the coded precinct size. From the frame header, the precincts are then decoded.

For each precinct the scenario and refinement, as determined by the rate control module 320, are decoded from the received bitstream 133. From the scenario and the refinement, the remaining coded structure of the precinct can be determined. Additionally, for each precinct, an offset extractor module 418 decodes or determines an offset table 420, corresponding to the offset table 332, from the received bitstream 133. The entropy decode module 410 decodes delta GCLI values 412 and a GCLI prediction mode 413. The delta GCLI values 412 and the GCLI prediction mode 413 are output to a GCLI reconstructer module 414. The GCLI reconstructer module 414 reconstructs GCLI values 416 according to the GCLI prediction mode 413 for the precinct, as obtained from the received bitstream 133. In arrangements where each subband has an independent GCLI prediction mode, a separate GCLI prediction mode is decoded for each subband. Then, for each coefficient group a predicted GCLI is determined according to the GCLI prediction mode of the subband and a GCLI delta is added to reconstruct the GCLI value for the coefficient group.

Using the GCLI values 416 and the offset table 420, an unpacker module 422 operates to extract bit-planes for the coefficient groups for the subbands in the precinct as decoded coefficients 424. A dequantiser module 426 performs inverse quantisation on the decoded coefficients 424 to produce wavelet coefficients 428. The inverse quantisation operation involves applying a suitable inverse quantisation step to convert a decoded coefficient into a wavelet coefficient (suitable for use by a synthesis wavelet filter bank). The inverse quantisation step is determined according to the GTLI for the subband, modified for each coefficient group in the subband according to a corresponding offset from the offset table 420. Equation [1] below can be used for derivation of the quantisation step size, with 'gtli' including the offset from the offset table 420. As the offset from the offset table affects the quantisation step size, the offset may also be referred to as a 'quantisation offset'.

$$dq = \frac{1 << (gcli + 1)}{(1 << (gcli - gtli + 1)) - 1}. \qquad \text{Equation [1]}$$

Then, an inverse transform module 430 applies a synthesis wavelet filter bank to the wavelet coefficients 428 to produce decoded video 135.

Figure 5A:
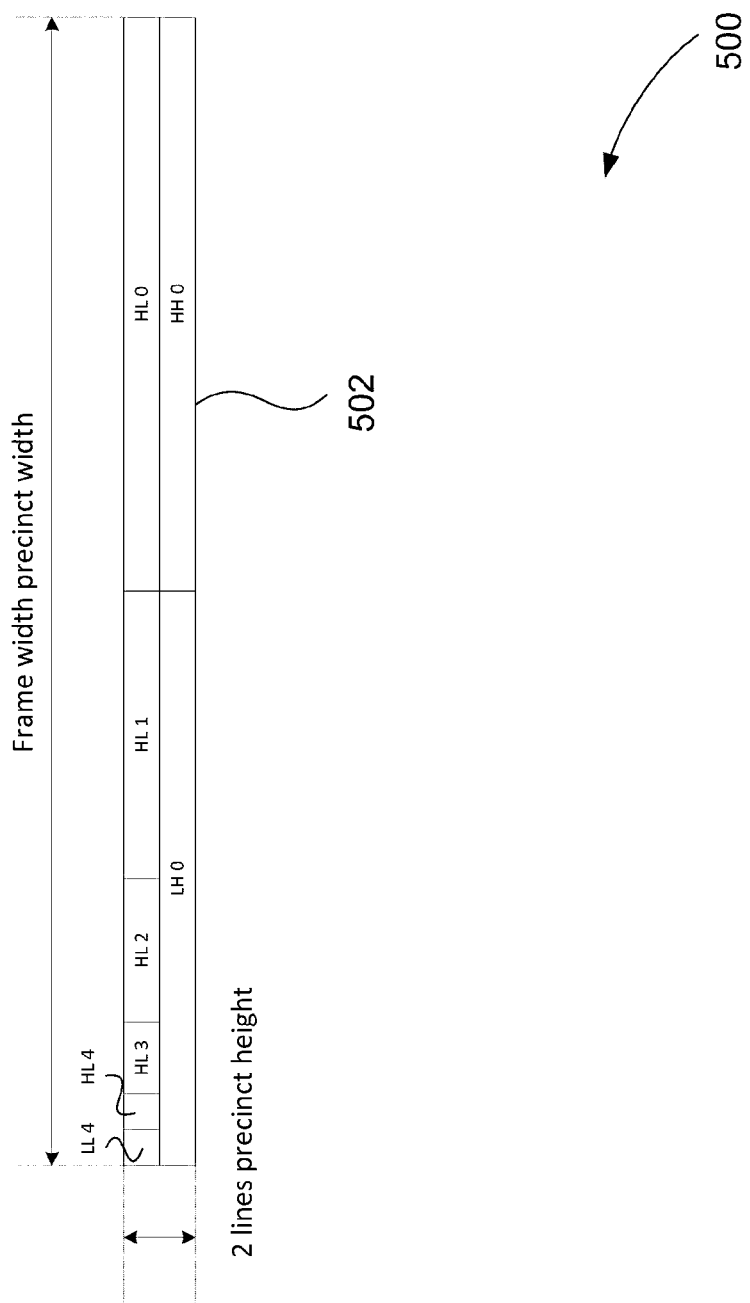
FIG. 5A is a schematic block diagram showing a Wavelet subband decomposition for a precinct.
Figure 5B:
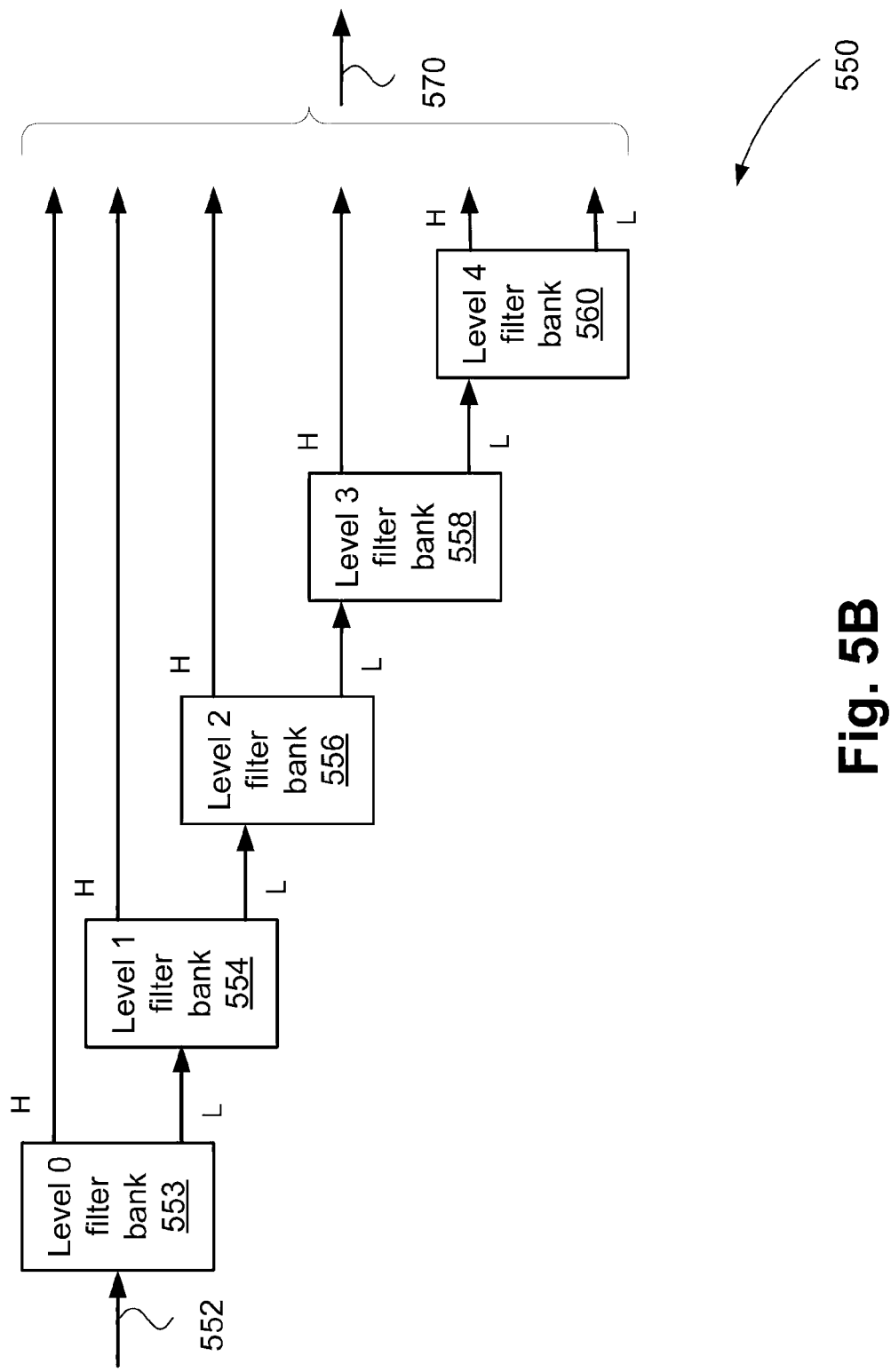
FIG. 5B is a schematic block diagram showing a Wavelet analysis filter bank.

FIG. 5A is a schematic block diagram showing a Wavelet subband decomposition for a precinct 500 of video data. FIG. 5B is a schematic block diagram showing a Wavelet analysis filter bank 550. In FIG. 5B, video samples 552 for a precinct are supplied to a set of wavelet analysis filters, such as filters 553, 554, 556, 558 and 560 that correspond to levels zero to five for horizontal decomposition. Each filter in the wavelet analysis filter bank 550 produces two sets of coefficients, low-pass coefficients ('L') and high-pass coefficients ('H'). The low-pass coefficients L are passed to the next level (i.e. from level N to level N+1) in the filter bank 550. The low-pass coefficients 'L' are further decomposed into 'H' and 'L' sets at the next level of the filter bank 550, until the final level (i.e. level four in FIG. 5B), at which level both 'H' and 'L' coefficients are output. Collectively, the sets of coefficients are output as subband coefficients 570. FIG. 5B shows five levels horizontal decomposition. Thus the subband coefficients 570 include six subbands.

One level of vertical decomposition adds another two subbands of coefficients, as shown in FIG. 5A. Each set of coefficients is identified by the level of the filter used to produce the set, and as 'H' or 'L', forming distinct subbands. The samples of each colour component are processed using separate filters, tripling the number of subbands (assuming the same decomposition structure is used across all colour components). Moreover, although FIG. 5B shows one dimension of wavelet decomposition, operating on a video data generally requires performing the decomposition vertically and horizontally. Then, each subband is identified as a two letter sequence, indicating the 'H' and 'L' sets in the vertical and horizontal dimension, followed by the decomposition level. A subband arrangement 502 in FIG. 5A shows subband identification for a precinct of video data in the video processing system 100. The subband arrangement 502 shows one level of vertical decomposition and five levels of horizontal decomposition, resulting in eight subbands for a colour component. Thus, when using the 4:4:4 chroma format and applying the subband arrangement 502 for each colour component, the total number of subbands is 24. As shown in FIG. 5A, each subband is sized according to the number of coefficients contained therein, and the subbands are illustrated together occupying a spatial area matching that of the samples provided to the analysis filter bank 550 (FIG. 5B). The two resulting subbands from the one level of vertical decomposition are shown as 'LH 0' and 'HH 0' and the six resulting subbands from the five levels of horizontal decomposition are shown as 'HL 0', 'HL 1', 'HL 2', 'HL 3', 'HL 4', and 'LL 4'.

FIG. 5C shows a subband coefficient grouping for representation in a bitstream, with a fixed truncation threshold. A portion of a subband 5100 includes a number of coefficients 5102, arranged into a series of groups, e.g. groups 5104, 5106 and 5108 in FIG. 5C. Each of the groups contains a fixed number of coefficients, e.g. four coefficients. The binary representation of each coefficient is also shown for the portion 5100 shown. A set of bit-planes 510 for the portion 5100 is also shown. To code each coefficient, the GCLI values are derived. As seen in FIG. 5C, the groups 5104, 5106 and 5108 contain coefficients resulting in significant bits in bit-planes 5, 4 and 7, respectively. In the example of FIG. 5C, a horizontal prediction scheme is shown, resulting in delta GCLI values 5120 and 5122, being −1 and +3 respectively. The bit-planes above the GCLI bit-planes in each group contain only zero values (indicated as bits 5110) and are not coded. The bits 5110 are said to be not significant and not coded. For the coefficient groups within a subband, a particular GTLI threshold 5114 exists. The GTLI threshold 5114 is a result of the scenario applied to all subbands in the precinct, a subband-wide level offset for controlling the relative weighting of bits between different subbands, and the possibility of coding an extra bit-plane by including the subband in a 'refinement' pass.

The refinement pass results in a lowering of the GTLI threshold 5114 for a subset of the subbands. The subset is derived from a refinement order table and the refinement is applied to the first zero or more entries in the refinement order table. Using the refinement pass allows a finer granularity of rate control compared to the scenario selection mechanism, and thus reduces the amount of unused bits in a given precinct. Moreover, application of an offset for each coefficient group from an offset table allows for variation in the GTLI threshold 5114 for different coefficient groups within the subband. As seen in FIG. 5C, the GTLI threshold for the group 5108 is raised by one bit-plane relative to the GTLI thresholds of the groups 5104 and 5106. Coefficient bit-planes below the GTLI threshold for the considered coefficient group, i.e. bits 5116, are significant (the bits contain useful information) but are not coded and thus are lost. Accordingly, only the bits 5112 (the bit of each of the groups 5104, 5106 and 5108 surrounded by continuous lines) are significant and coded. Given that the video processing system 100 cannot retain all significant bits (i.e. the scenario cannot always indicate bit 0), allocating the bits that make a greater contribution to the subjective quality of the decoded video data (video data 135), is preferable. It is possible for the GTLI threshold 5114 to result in a coefficient group with no significant bit-planes to be coded, affecting the GCLI delta values, with special handling for the case where no bit-planes are coded for a coefficient group. Thus, scenario selection has an impact on GCLI coding cost. Each subband may also have an independent subband 'gain' applied. Sets of subband gains are known as weighting tables.

The weighting of GTLI thresholds between subbands may also be adjusted, with two common weightings defined: 'visual' and 'psnr'. The 'psnr' weighting compensates for the difference in gain seen at each level of wavelet decomposition, resulting in each coefficient having uniform impact and thus maximising PSNR of the decoded bitstream. The 'visual' weighting provides greater precision to subbands deemed to make a greater contribution to visual quality, at the expense of other subbands deemed less visually significant. A drawback of using a weighting scheme is uniform application across the entire subband and hence uniform application across the precinct. Determination of the GTLI offset map with intra-subband precision provides a higher degree of adaptivity and mitigates against adverse rate control behaviour in the presence of distinctly different wavelet coefficient statistics in different portions of the subbands of a precinct.

A gain table value ('gain[sb_idx]') and a refinement table value ('priority[sb_idx]') are considered. The GTLI threshold 5114 is determined as shown in Equation [2] below:

$$GTLI(sb\_idx) = \text{MAX}(0, \text{scenario} + \text{offset\_table} [\text{map\_offsets}[\text{coeff\_group\_idx}]] - \text{gain}[sb\_idx] - ((\text{priority}[sb\_idx] < \text{refinement})?1:0)) \quad \text{Equation [2]}.$$

Figure 5D:
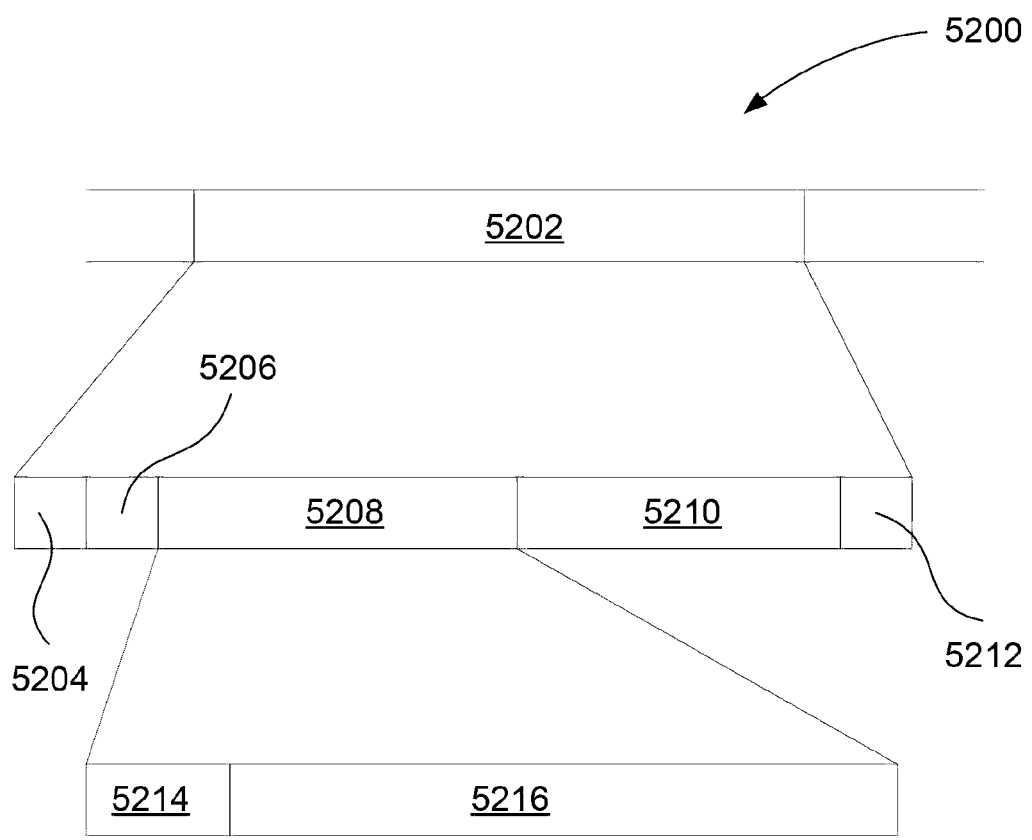
FIG. 5D is a schematic block diagram showing a bitstream decomposition for a precinct.

In Equation [2], coeff_group_idx identifies the coefficient group within the considered subband and map_offsets converts the coefficient group index into an offset table index. At a given decomposition level, e.g. level 3, map_offsets is a 1:1 mapping, then, at lower decomposition levels, e.g. level 2, map_offsets maps every 2 coefficient group indices to a single offset table index, and so forth. Then, offset_table is the offset table or map as determined in the step 706 of FIG. 7 and decoded in the step 802 of FIG. 8. For higher levels of decomposition, e.g. level 4, the offset table is not used and offset_table in Equation [2] is ignored. The map_offsets relationship is implemented by bit shifting a coefficient group index according to the difference in decomposition level between the considered level and the level at which the offset table was generated. Accordingly, the map_offsets relationship does not require an explicit table look-up. This map_offsets relationship permits the single offset table generated in the step 706 of FIG. 7 to be used across multiple levels of wavelet decomposition. FIG. 5D shows a bitstream 5200 decomposition for a coded precinct 5202. The coded precinct 5202 uses a particular ordering and grouping for coding the wavelet subbands, as follows. The horizontal decomposition subbands, i.e. LL 4, HL4, HL3, HL2, HL1, and HL0, for each colour component are grouped into a subpacket 5208 and the vertical decomposition subbands, i.e. LH0 and HH0 for each colour component, are grouped into a subpacket 5210. The subpacket 5208 therefore includes coefficient data for eighteen (18) subbands and the subpacket 5210 includes coefficient data for six (6) subbands. Other methods of arranging the subband coefficient data in the coded precinct 5202 are also possible. Within each subpacket (i.e. 5208 and 5210), coded GCLI deltas 5214 and coefficient data 5216 are present for all the associated subbands.

The coded precinct 5202 includes coded rate control parameters 5204, a coded offset table 5206, and coded GCLIs 5208. The rate control parameters 5204 define the scenario and refinement for the subbands in the precinct. The rate control parameters 5204, in combination with the coded offset table 5206, allow the GTLI for each coefficient group in each subband of the precinct to be determined. The offset table 5206 permits the GTLI to vary between coefficient groups within a subband, resulting in reduced coding cost for particular coefficient groups. Then, using the coded GCLIs 5208 the number of coded bit-planes for each coefficient group in the precinct are determined, and encoded as coefficient data 5210. As the rate control parameters 5204, the coded GCLIs 5208 and the coefficient data 5210 are not likely to occupy the entirety of the coded precinct 5202, an unused data portion 5212 is typically also present. The size of the unused data portion 5212 is minimised due to the selection of suitable rate control parameters 5204, e.g. by selecting as many subbands for refinement as achievable within the constraint of the size of the coded precinct 5202.

Figure 6:
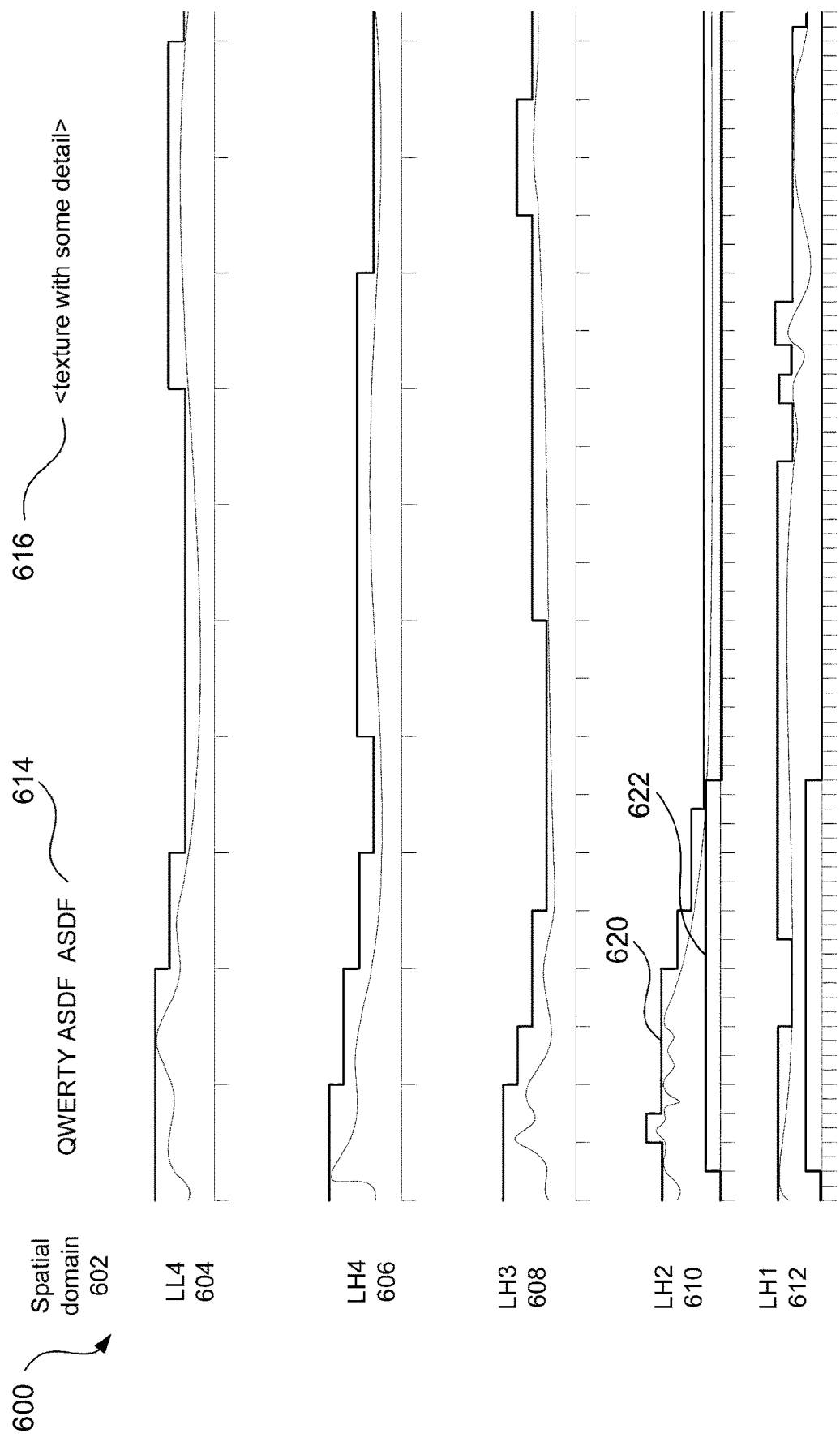
FIG. 6 is a schematic block diagram showing a subband coefficient grouping for representation in a bitstream, with a variable truncation threshold.

FIG. 6 shows a representation 600 of a bitstream. The representation 600 shows a subband coefficient grouping for representation in the bitstream, with a variable truncation threshold. Example spatial domain 602 is representative of pixel data in a frame and includes some example text 614 and some region with finer detail 616, such as some textured video data (e.g. some natural content such as grass or trees). As the finer detail 616 is not a smooth region (e.g. a cloudless sky, which has very smooth variation in content and is thus predominantly occupies low frequency or higher subband coefficient energy), there is some high frequency information in the wavelet domain worthy of preservation for maintaining high visual quality at the decoder. The text 614 includes a large coefficient magnitude across multiple subbands in the wavelet domain, and thus consumes a significant portion of the bit rate afforded to the considered precinct.

FIG. 6 shows five subbands, being LL4 604, LH4 606, LH3 608, LH2 610 and LH1 612. For each of the subbands 604, 606, 608, 610, and 612, an axis is shown with markings dividing the coefficients into coefficient groups. For each of the subbands 604, 606, 608, 610, and 612 the coefficient magnitude is shown as the coefficient magnitude varies throughout the subband (for illustrative purposes, a continuous line is shown, whereas in fact each coefficient has a discrete magnitude and sign, and a fixed number of coefficients is present within each coefficient group). Each coefficient group contains a fixed number of coefficients, and the wider spacing between the markings for higher levels of wavelet decomposition (e.g. for the subbands 604, 606) reflects that there are fewer coefficients, and each coefficient has a larger support in the spatial domain 602 compared to lower levels of wavelet decomposition (e.g. for the subbands 610, 612). For each subband, the threshold of GCLI for each coefficient group is shown, e.g. a threshold 620 for the subband 610. As the GCLI is set per coefficient group, the changes in the GCLI threshold (e.g. 620) only occur at coefficient group boundaries for the considered subband (this is evident for each of the subbands 604 606 608 610 and 612 shown in FIG. 6). Further, for each subband, the threshold of GTLI for each coefficient group is shown, e.g. 622 for the subband 610.

As shown in FIG. 6, the GTLI threshold varies throughout the subband. The gap between the GCLI threshold 620 and the GTLI threshold 622 is indicative of the bit-plane coding cost and the precision for the considered coefficient group within a subband. As seen in FIG. 6, a series of coefficient groups in the subbands 610 and 612 have a positive offset applied. The offset is coincident with increased wavelet coefficient energy across coefficients spanning all of the subbands, spatially corresponding with the text 614. The wide (increased) spectral energy raises the GCLI for the associated coefficient groups, and with a fixed GTLI across the subband would also thus raise the quantisation level of the coefficients for the coefficient groups. Raising the quantisation level reduces the precision of the high-energy coefficients, leading to a consequent reduction in coding cost. The coding cost can be visualised as the gap between the GCLI threshold 620 and the GTLI threshold 622. The reduction in the coding cost of portion(s) of a subband due to the application of positive offsets in the offset table allows the rate control module 320 to afford an overall increase in the precision (reduction in the GTLI threshold 622) across the subband. In particular, portions of the subband with low energy are subject to a lower GTLI threshold, resulting in improved precsion in these low energy portions. The low energy portions are visually significant as the low energy portions may contain detail that would otherwise be lost or corrupted.

As the coding cost for the entire precinct cannot exceed the bit budget, in the absence of the raised GTLI threshold for the coefficient groups, less significant bits of other coefficients of the groups would be coded and thus less precision would be afforded the other coefficients. The precision makes a greater contribution to visual quality for the other coefficients. For example, it would be necessary to have fewer subbands subject to a refinement pass, raising the GTLI value for the affected subbands. In some instances, selecting a higher scenario would be necessary, raising the GTLI threshold for all subbands. As shown in the coefficients co-incident with the textured detail 616, raising the GTLI threshold for a subband, e.g. the subband 612, would substantially reduce the precision of the coded coefficients, as the coefficient magnitudes coincident with the detail 616 are smaller, so the corresponding GCLIs are lower, and the loss of a bit-plane has a relatively greater impact visually. The application of a non-uniform GTLI offset table within a subband can be seen as evening the precision of the coefficients thoughout the subband.

FIG. 7 is a schematic flow diagram showing a method 700 of encoding a bitstream with a variable truncation offset within a subband. The method 700 may be implemented as one or more modules of the application 233 (such as the modules of FIG. 3), stored in the memory 206 and controlled by execution of the processor 205.

Execution of the method 700 results in an encoded bitstream 115 (FIG. 1) having a reduction in precision of coefficients in portions of subbands with higher energy, and consequently harsher quantisation. The reduction in precision allows for an increase in precision in coefficients elsewhere in the subband (and in other subbands). Execution of the method 700 applies a heuristic to determine an offset table for adjusting the GTLI threshold for each coefficient group in a subband at a given level of decomposition. The method 700 begins at a wavelet analysis transform step 702.

At the wavelet analysis transform step 702, the transform module 310, under control of the processor 205, applies a wavelet filter or wavelet transform, such as a 5/3 Le Gall wavelet transform to a precinct of video data. For ultra-low latency operation, the precinct is constrained in size to two video lines height, and the full width of the frame. The step 702 executes to produce sets of wavelet coefficients, grouped into subbands in accordance with the wavelet decomposition, as described with reference to FIGS. 5A and 5B. The module 314 executes to determine the GCLIs (such as the GCLIs 316) at step 702 by determining the GCLI bit-plane for each coefficient group of each subband. Control in the processor 205 then passes the method 700 to a coefficient energy detection step 704.

At the coefficient energy detection step 704, the offset deriver module 330, under control of the processor 205, generates a precinct coefficient energy indication. The precinct coefficient energy indication divides the precinct spatially into sections, generally equally sized. The section count across the precinct may correspond with the number of coefficient groups at a particular level N of horizontal wavelet decomposition, e.g. at level 2 (out of 5 levels of decomposition). In each section, a local coefficient energy indication is derived. The local coefficient energy indication is derived by considering magnitudes of coefficients in several subbands of the precinct, e.g. from level N down to level 0. At level N, the coefficients of a single coefficient group corresponding to the section (e.g. section i) are considered. At level N−1, the coefficients of coefficient groups corresponding to section 2i to 2i+1 are considered and at level N−2, the coefficients of coefficient groups corresponding to section 4i to 4i+3 are considered, and so forth. Accordingly, the energy indication for a given section correlates with the total high frequency energy as indicated by the sums of wavelet coefficients from lower levels of decomposition overlapping with the section spatially. The support of five samples for a 5/3 Le Gall wavelet implies some additional overlap with neighbouring coefficient groups of sections, however this need not be considered for the purpose of offset table generation.

The subbands considered are typically at lower levels of decomposition, and hence have coefficients with smaller spatial support. The considered coefficients capture high frequency energy (sharp edges) in the incoming video data 113. The concentration of high energy over multiple subbands is indicative of sharp edges spatially in the video data 113, with resulting relatively high GCLI values. Then, the sections of relatively high energy over multiple subbands are marked as high energy sections. Sections with relatively lower magnitude coefficients, or spurious energy that is less pronounced across multiple subbands are marked as low energy sections. The classification of the precinct into high energy and low energy sections enables generation of the offset table. Control in the processor 205 then progresses the method 700 to an intra-subband offset table generation step 706.

At the intra-subband offset table generation step 706, the offset deriver module 330, under control of the processor 205, executes to generate an offset table (such as the table 332) for the precinct. The offset table is generated from the classification of the precinct into regions of high energy and low energy, by smoothing the classification into runs or sets of offsets. Each section from the step 704 is first classified as being locally low energy or locally high energy by applying a threshold. This first classification results in a 'noisy' classification in the sense that spurious detections of high energy sections in a predominantly low energy group of sections, and vice versa, are possible. To produce a smoother classification, a horizontal filter is applied. In applying the horizontal filter the classification for each section is re-evaluated in light of the classifications of spatially neighbouring sections (in the horizontal direction, as the evaluation is confined to operate on a precinct-by-precinct basis). For example, a majority (3 out of 5) filter can be applied, largely eliminating spurious transitions in classification. The filter can be implemented as a five-tap FIR filter with uniform coefficients for example, followed by a threshold operation. The majority filter is useful for regions of high coefficient energy with intermittent breaks, e.g. text with some spacing between words.

Sections of low energy are then assigned a zero value offset and regions of high energy are assigned a positive integer offset. Application of a smoothing function can result in offset values being constrained to values of zero and one, such that regions of intermittently high energy receive the offset value of one. Additionally, regions of consistently high energy classification may receive an offset value of two. For example, in addition to the previous filtering rule, a 5/5 majority filter could result in an offset of two. The step 706 operates to generate the offset table to decrease a precision afforded to portions of the subband having coefficients of greater magnitude relative to portions of the subband having lower magnitude coefficients. The GCLI prediction module 315 can execute as part of step 706 to determine the GCLI delta values. The GCLI prediction module 315 selects a prediction mode for predicting each GCLI value. For each coefficient group a predicted GCLI is produced, e.g. from a neighbouring coefficient group. Then, a delta GCLI is coded to produce the required GCLI. Control in the processor 205 then progresses the method 700 to a scenario selection step 708.

At the scenario selection step 708, the rate control module 320, under control of the processor 205, selects the 'scenario' for coding the precinct. The scenario sets a base GTLI threshold applicable to all subbands in the precinct, such that the scenario specifies the lowest bit-plane for coefficient bit-plane coding that does not result in exceeding the bit budget for the precinct. The impact of the offset table of step 706 is taken into account in determining coding costs. Control in the processor 205 then passes the method 700 to a refinement selection step 710.

At the refinement selection step 710, the rate control module 320, under control of the processor 205, selects the 'refinement' for coding the precinct. The refinement is an integer specifying how many subbands one additional bit-plane is to be coded for. The largest refinement is selected that does not result in exceeding the bit budget remaining after the step 708. A 'priority list' of subbands establishes an order for which subbands are to be considered for refinement. For a given refinement value, the first zero or more subbands in the priority list are selected for refinement. Control in the processor 205 then passes the method 700 to a coefficient quantisation step 712.

At the coefficient quantisation step 712, the quantiser module 324, under control of the processor 205, quantises the coefficients groups 312 according to a quantisation threshold, to produce truncated coefficient groups 326. The quantisation threshold for each subband is determined from the scenario and the refinement. The quantisation threshold applied to a particular coefficient group is further adjusted according to the corresponding entry in the offset table. As the truncation of bit-planes below the quantisation threshold results in a loss of data, an offset is applied to ensure evenly distributed rounding. Other offsets are also possible, using non-uniform rounding to take into account the statistical distribution of coefficients relative to the effective quantiser step size (i.e. two to the power of the quantisation threshold). Control in the processor 205 then passes the method 700 to an encode offset table step 714.

At the encode offset table step 714, the entropy encoder module 318, under control of the processor 205, encodes the offset table into the encoded bitstream 115. For a fixed number of 'n' sections per precinct, and an offset table constrained to values zero and one, the offset table can be encoded as a fixed length sequence of n bits. As the offset table tends to have relatively long runs of zero or one (or other value if more than two offsets are permitted), run length encoding for the offset table can be used. Run length coding results in a more compact representation, although the resulting string of bits will have a variable length. Control in the processor 205 then passes the method 700 to an encode significant bit-planes step 716.

At the encode significant bit-planes step 716, the packer module 328, under control of the processor 205, encodes coefficient data into the encoded bitstream 115. For each coefficient group, bit-planes from the GCLI value down to the GTLI, modified in accordance with the corresponding entry in the offset table, are coded (or 'packed') into the encoded bitstream 115. As such, coefficient groups spanning multiple subbands and containing relatively high energy (hence higher GCLI values) have one or more of the lowest bit-planes truncated relative to other coefficient groups in the considered subband. This additional truncation resulted in a reduced coding cost for those coefficient groups that was exploited in the steps 708 and 710 to select an overall higher quality for the precinct. In other words, bits have been allocated away from portions of the precinct where the bits make relatively smaller contribution to visual quality and towards other parts of the precinct where the bits can make a relatively greater contribution to overall visual quality. The visual quality across a frame having mixed content can accordingly be improved. The method 700 then terminates.

FIG. 8 is a schematic flow diagram showing a method 800 of decoding a bitstream with a variable truncation offset within a subband. The method 800 may be implemented as one or more modules of the application 233 (such as the modules of FIG. 4), stored in the memory 206 and controlled by execution of the processor 205. The method 800 begins at a decode offset table step 802.

At the decode offset table step 802, the entropy decoder module 410, the offset extractor module 418 under control of the processor 205, decode an offset table from the received bitstream 133. The offset table is decoded in accordance with the encoding method of the step 714 of FIG. 7. The offset table specifies a set of offsets for the purpose of setting GTLI thresholds for each coefficient group in one or more subbands of the considered precinct. The set of offsets, derived at the step 706 of FIG. 7, reduce the coding cost of sets of higher energy wavelet coefficients, affording more rate for coefficients elsewhere in the precinct. Accordingly, overall visual quality is improved relative to using the constant threshold resulting from the scenario and refinement values for the precinct. Control in the processor 205 then passes the method 800 to a decode coefficient group step 803.

At the decode GCLIs step 803, the entropy decoder module 410 and the GCLI reconstructor module 414, under control of the processor 205, decode a GCLI prediction mode and GCLI deltas from the received bitstream 133 to produce GCLI values 416. Control in the processor 205 then progresses the method 800 to a decode coefficient group step 804.

At the decode coefficient group step 804, the unpacker module 422, under control of the processor 205, decodes (or 'unpacks') bit-planes from coefficient groups from the received bitstream 133 to produce decoded coefficients 424 for a coefficient group. The bit-planes ranging from the GCLI value for the coefficient group down to the GTLI threshold, modified according to the offset from the offset table for the coefficient group are unpacked from the bitstream. Control in the processor 205 then passes the method 800 to a coefficient dequantisation step 806.

At the coefficient dequantisation step 806, the dequantiser module 426, under control of the processor 205, performs inverse quantisation on the coefficients within each coefficient group. The inverse quantisation operation requires scaling a decoded coefficient with the inverse quantisation step size (as described with reference to Equation [1]), derived in accordance with the GTLI value for subband, and adjusted according to the offset from the offset table corresponding to the considered coefficient group. Steps 804 and 806 together operate to decode a group of subband coefficients for a subband from the bitstream by applying the offset table to determine a number of bits to read for each coefficient based on the offset for the group of sub-band coefficients. Control in the processor 205 then passes the method 800 to a wavelet synthesis filters step 808.

At the wavelet synthesis filters step 808, the inverse transform module 430, under control of the processor 205, transforms the wavelet coefficients 428 into decoded video 135 by applying a wavelet synthesis filter bank, reversing the decomposition that took place in the wavelet analysis filter bank (i.e. in the transform module 310). The step 808 applies an inverse transform of the forward wavelet transform applied at step 702 of FIG. 7. As a result of execution of the step 808, samples for each pixel in the considered precinct are generated and thus are available for output from the video decoder 134. The method 800 then terminates.

The offset map of the video processing system 100 allows for partial coding of the least significant coded bit-plane for a subband. The bit-plane is partially coded in the sense that any coefficient group mapping to a nonzero offset in the offset table has one or more least significant bit planes not coded (relative to the least significant bit-plane that is coded for a coefficient group having an offset value of zero). In comparison, the JPEG2000 image coding standard, although having bit-plane coding, parses the entirety of a bit-plane, generally using techniques like run length coding or arithmetic coding to achieve compression. The low complexity nature of the video processing system 100 precludes the use of arithmetic coding. Moreover, the grouping of coefficients in coefficient groups provides an atomic data unit of four bits, facilitating high speed implementation, e.g. in FPGAs.

The method 700 describes a heuristic method for deriving the offset table in relation to step 706, which allows for a low complexity implementation. For other applications where increased coding efficiency is of higher priority than low complexity, the offset table may be derived using a searching function. In an arrangement of the method 700, the offset table is generated by progressively testing particular offset values, e.g. 0 and 1, and performing a search. Rather than performing a full search, which would be prohibitive in terms of complexity, a progressive search through the table may be utilised. In an arrangement using a progressive search, as each offset is tested, the synthesis wavelet is performed and an error is generated. The offset minimising the generated error is used, and the search progresses to the next offset.

Additionally, the video source 112 may have been produced by means where metadata describing the location of different content types is present. For example, a device may overlay text onto other content. The textual region may be deemed as excessively consuming rate that is needed elsewhere in the overlapping precincts. In an arrangement of the method 700, the coefficient energy detection step 704 is augmented with, or replaced by, the receipt of the metadata. Then, generation of the offset table relates to applying a positive offset where a region of content known to contain excessively high frequency energy is present. Wavelet coefficients that partially or fully overlap with the specified region may receive an offset of one. Alternatively, wavelet coefficients that partially overlap with the specified region may receive an offset of one whilst wavelet coefficients that fully overlap with the specified region may receive an offset of two.

In another arrangement of the method 700, the offset map derivation (e.g. step 706) is also sensitive to the overall bit-rate afforded to the precinct (in addition to the wavelet coefficients 312). In arrangements where the offset map generation is sensitive to the overall bit-rate afforded to the precinct, for high data rate operation (e.g. with the bits per pixel rate exceeding eight BPP) the offset table is biased partially for fully towards zero offsets. The arrangements reduce the added truncation of wavelet coefficients when abundant compressed bit rate is available for the bitstream.

INDUSTRIAL APPLICABILITY

The arrangements described are applicable to the computer and data processing industries and particularly for the digital signal processing industries for the encoding a decoding of signals such as video signals for a low-latency (sub-frame) video coding system. By applying variable quantisation of coefficients within a sub-band, visual quality across a frame having mixed content can be improved. The methods described can be used to improve visual content of a frame having mixed content in low-latency systems.

The foregoing describes only some embodiments of the present invention, and modifications and/or changes can be made thereto without departing from the scope and spirit of the invention, the embodiments being illustrative and not restrictive.

The invention claimed is:

1. An image decoding apparatus for generating an image frame from a bitstream, the image frame being encoded in the bitstream by dividing into a plurality of wavelet-subbands, each of the plurality of wavelet-subbands including sets of wavelet coefficients, the image frame including a precinct including one or more wavelet-subbands, the image decoding apparatus comprising:
   a decoding unit configured to decode information for determining a mode for the wavelet-subband from the bitstream, the mode being used to determine most significant bitplane indices for the wavelet-subband, the mode being selected from at least a first mode which uses prediction in a vertical direction and a second mode which is a raw mode not using prediction, and each of the most significant bitplane indices indicating a highest significant bitplane;
   a first determination unit configured to determine the mode for the wavelet-subband based on the information;
   a second determination unit configured to determine the most significant bitplane indices for the sets of wavelet coefficients in the wavelet-subband according to the mode for the wavelet-subband determined by the first determination unit;
   a third determination unit configured to determine truncation positions for the sets of wavelet coefficients in the wavelet-subband according to a refinement parameter in a header of encoded data of the precinct; and
   a generating unit configured to generate the image frame by decoding the wavelet coefficients from the bitstream according to the most significant bitplane indices determined by the second determination unit and the truncation positions determined by the third determination unit,
   wherein, in a case where the second determination unit determines the most significant bitplane indices according to the first mode,
   the decoding unit decodes, from the bitstream, delta values of prediction for the most significant bitplane indices for the sets of wavelet coefficients in the wavelet-subband, and
   the second determination unit predicts the most significant bitplane indices in a vertical direction and determines the most significant bitplane indices according to the predicted most significant bitplane indices and the delta values decoded by the decoding unit, and
   wherein, the first determination unit is capable of determining the mode on a wavelet-subband-by-wavelet-subband basis, based on the information.

2. The image decoding apparatus according to claim 1, wherein, the mode is selected from the first mode, the second mode and a third mode which uses prediction in a horizontal direction.

3. The image decoding apparatus according to claim 1, wherein, in a case where the second determination unit determines the most significant bitplane indices according to the second mode,
   the decoding unit decodes information which indicates the most significant bitplane indices, and
   the second determination unit determines the most significant bitplane indices according to the information which indicates the most significant bitplane indices.

4. The image decoding apparatus according to claim 1, wherein, the plurality of wavelet-subbands respectively correspond to frequency bands of the image frame.

5. An image encoding apparatus for encoding an image frame into a bitstream, the image frame being encoded into the bitstream by dividing into a plurality of wavelet-subbands, each of the plurality of wavelet-subbands including sets of wavelet coefficients, the image frame including a precinct including one or more wavelet-subbands, the image encoding apparatus comprising:
   a first determination unit configured to determine a mode for the wavelet-subband, the mode being used to encode most significant bitplane indices for the wavelet-subband, and the mode being selected from at least a first mode which uses prediction in a vertical direction and a second mode which is a raw mode not using prediction, each of the most significant bitplane indices indicating a highest significant bitplane;
   a second determination unit configured to determine the most significant bitplane indices for the sets of wavelet coefficients in the wavelet-subband;
   a third determination unit configured to determine truncation positions for the sets of wavelet coefficients in the wavelet-subband according to a refinement parameter in a header of encoded data of the precinct; and an encoding unit configured to encode the image frame by encoding, into the bitstream, information for indicating the mode for the wavelet-subband, wherein, the encoding unit encodes the wavelet coefficients according to the mode determined by the first determination unit, the most significant bitplane indices determined by the second determination unit, and the truncation positions determined by the third determination unit, and wherein, in a case where the encoding unit encodes the most significant bitplane indices according to the first mode, the encoding unit encodes, into the bitstream, delta values of prediction in a vertical direction for the most significant bitplane indices for the sets of wavelet coefficients in the wavelet-subband, and encodes the information for indicating the first mode, and wherein, the first determination unit is capable of determining the mode for the wavelet-subband on a wavelet-subband-by-wavelet-subband basis.

6. The image encoding apparatus according to claim 5, wherein, the mode is selected from the first mode, the second mode, and a third mode which uses prediction in a horizontal direction.

7. The image encoding apparatus according to claim 5, wherein, in a case where the encoding unit encodes the most significant bitplane indices according to the second mode, the encoding unit encodes information which indicates the most significant bitplane indices, and encodes information for indicating the second mode.

8. The image encoding apparatus according to claim 5, wherein, the plurality of wavelet-subbands respectively correspond to frequency bands of the image frame.

9. An image decoding method for generating an image frame from a bitstream, the image frame being encoded in the bitstream by dividing into a plurality of wavelet-subbands, each of the plurality of wavelet-subbands including sets of wavelet coefficients, the image frame including a precinct including one or more wavelet-subbands, the image decoding method comprising:

decoding information for determining a mode for the wavelet-subband from the bitstream, the mode being used to determine most significant bitplane indices for the wavelet-subband, the mode being selected from at least a first mode which uses prediction in a vertical direction and a second mode which is a raw mode not using prediction, each of the most significant bitplane indices indicating a highest significant bitplane;

determining the mode for the wavelet-subband based on the information;

determining the most significant bitplane indices for the sets of wavelet coefficients in the wavelet-subband according to the mode for the wavelet-subband;

determining truncation positions for the sets of wavelet coefficients in the wavelet-subband according to a refinement parameter in a header of encoded data of the precinct; and generating the image frame by decoding the wavelet coefficients from the bitstream according to the most significant bitplane indices for the sets of wavelet coefficients and the truncation positions for the sets of wavelet coefficients, wherein, in a case where the most significant bitplane indices are determined according to the first mode, the image decoding method comprises:

decoding, from the bitstream, delta values of prediction for the most significant bitplane indices for the sets of wavelet coefficients in the wavelet-subband;

predicting the most significant bitplane indices in a vertical direction; and determining the most significant bitplane indices according to the predicted most significant bitplane indices and the delta values, wherein, the mode is capable of being determined on a wavelet-subband-by-wavelet-subband basis, based on the information.

10. The image decoding method according to claim 9, wherein the mode is selected from the first mode, the second mode, and a third mode which uses prediction in a horizontal direction.

11. The image decoding method according to claim 9, wherein, in a case where the most significant bitplane indices are determined according to the second mode, the image decoding method comprises:

decoding information which indicates the most significant bitplane indices, and determining the most significant bitplane indices according to the information which indicates the most significant bitplane indices.

12. The image decoding method according to claim 9, wherein, the plurality of wavelet-subbands respectively correspond to frequency bands of the image frame.

13. An image encoding method for encoding an image frame into a bitstream, the image frame being encoded into the bitstream by dividing into a plurality of wavelet-subbands, each of the plurality of wavelet-subbands including sets of wavelet coefficients, the image frame including a precinct including one or more wavelet-subbands, the image encoding method comprising:

determining a mode for the wavelet-subband, the mode being used to encode most significant bitplane indices for the wavelet-subband, and the mode being selected from at least a first mode which uses prediction in a vertical direction or a second mode which is a raw mode not using prediction, each of the most significant bitplane indices indicating a highest significant bitplane;

determining the most significant bitplane indices for the sets of wavelet coefficients in the wavelet-subband;

determining truncation positions for the sets of wavelet coefficients in the wavelet-subband according to a refinement parameter in a header of encoded data of the precinct; and encoding the image frame by encoding, into the bitstream, information for indicating the mode for the wavelet-subband, wherein, the wavelet coefficients are encoded according to the mode for the wavelet-subband, the most significant bitplane indices for the sets of wavelet coefficients, and the truncation positions for the sets of wavelet coefficients, and wherein, in a case where the most significant bitplane indices are encoded according to the first mode, the image encoding method comprises:

encoding, into the bitstream, delta values of prediction in a vertical direction for the most significant bitplane indices for the sets of wavelet coefficients in the wavelet-subband; and encoding the information for indicating the first mode, and wherein, the mode for the wavelet-subband is capable of being determined on a wavelet-subband-by-wavelet-subband basis.

14. The image encoding method according to claim 13, wherein, the mode is selected from the first mode, the second mode, and a third mode which uses prediction in a horizontal direction.

15. The image encoding method according to claim 13, wherein, in a case where the most significant bitplane indices are encoded according to the second mode, the image encoding method comprises:

encoding information which indicates the most significant bitplane indices; and encoding information for indicating the second mode.

16. The image encoding method according to claim 13, wherein, the plurality of wavelet-subbands respectively correspond to frequency bands of the image frame.

17. A non-transitory computer-readable storage medium which stores a program for executing an image decoding method for generating an image frame from a bitstream, the image frame being encoded in the bitstream by dividing into a plurality of wavelet-subbands, each of the plurality of wavelet-subbands including sets of wavelet coefficients, the image frame including a precinct including one or more wavelet-subbands, the image decoding method comprising:

decoding information for determining a mode for the wavelet-subband from the bitstream, the mode being used to determine most significant bitplane indices for the wavelet-subband, the mode being selected from at least a first mode which uses prediction in a vertical direction and a second mode which is a raw mode not using prediction, each of the most significant bitplane indices indicating a highest significant bitplane;

determining the mode for the wavelet-subband based on the information;

determining the most significant bitplane indices for the sets of wavelet coefficients in the wavelet-subband according to the mode for the wavelet-subband;

determining truncation positions for the sets of wavelet coefficients in the wavelet-subband according to a refinement parameter in a header of encoded data of the precinct; and generating the image frame by decoding the wavelet coefficients from the bitstream according to the most significant bitplane indices for the sets of wavelet coefficients and the truncation positions for the sets of wavelet coefficients, wherein, in a case where the most significant bitplane indices are determined according to the first mode, the image decoding method comprises:

decoding, from the bitstream, delta values of prediction for the most significant bitplane indices for the sets of wavelet coefficients in the wavelet-subband;

predicting the most significant bitplane indices in a vertical direction; and determining the most significant bitplane indices according to the predicted most significant bitplane indices and the delta values, wherein, the mode is capable of being determined on a wavelet-subband-by-wavelet-subband basis, based on the information.

18. A non-transitory computer-readable storage medium which stores a program for executing an image encoding method for encoding an image frame into a bitstream, the image frame being encoded into the bitstream by dividing into a plurality of wavelet-subbands, each of the plurality of wavelet-subbands including sets of wavelet coefficients, the image frame including a precinct including one or more wavelet-subbands, the image encoding method comprising:

determining a mode for the wavelet-subband, the mode being used to encode most significant bitplane indices for the wavelet-subband, and the mode being selected from at least a first mode which uses prediction in a vertical direction and a second mode which is a raw mode not using prediction, each of the most significant bitplane indices indicating a highest significant bitplane;

determining the most significant bitplane indices for the sets of wavelet coefficients in the wavelet-subband;

determining truncation positions for the sets of wavelet coefficients in the wavelet-subband according to a refinement parameter in a header of encoded data of the precinct; and encoding the image frame by encoding, into the bitstream, information for indicating the mode for the wavelet-subband, wherein, the wavelet coefficients are encoded according to the mode for the wavelet-subband, the most significant bitplane indices for the sets of wavelet coefficients, and the truncation positions for the sets of wavelet coefficients, and wherein, in a case where the most significant bitplane indices are encoded according to the first mode, the image encoding method comprises:

encoding, into the bitstream, delta values of prediction in a vertical direction for the most significant bitplane indices for the sets of wavelet coefficients in the wavelet-subband; and encoding the information for indicating the first mode, and wherein, the mode for the wavelet-subband is capable of being determined on a wavelet-subband-by-wavelet-subband basis.

* * * * *